US012518598B2

(12) United States Patent
Schultz et al.

(10) Patent No.: US 12,518,598 B2
(45) Date of Patent: *Jan. 6, 2026

(54) SYSTEM AND METHOD FOR FACILITATING A SECONDARY GAME

(71) Applicant: Kabam, Inc., San Francisco, CA (US)

(72) Inventors: Stephanie Schultz, San Francisco, CA (US); Luc Pieron, San Francisco, CA (US); Sam McLellan, San Francisco, CA (US); Henry Rull, Concord, CA (US); Kevin Simmons, Oakland, CA (US); Jay Jodway, San Francisco, CA (US); Weiwei Geng, Beijing (CN)

(73) Assignee: Kabam, Inc., San Francisco, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 18/304,433

(22) Filed: Apr. 21, 2023

(65) Prior Publication Data

US 2023/0252856 A1 Aug. 10, 2023

Related U.S. Application Data

(63) Continuation of application No. 17/580,345, filed on Jan. 20, 2022, now Pat. No. 11,657,679, which is a (Continued)

(51) Int. Cl.
*G07F 17/32* (2006.01)

(52) U.S. Cl.
CPC ................................ *G07F 17/3267* (2013.01)

(58) Field of Classification Search
None
See application file for complete search history.

(56) References Cited

U.S. PATENT DOCUMENTS 5,704,835 A 1/1998 Dietz, II
5,816,918 A 10/1998 Kelly
(Continued)

FOREIGN PATENT DOCUMENTS

KR 1020130137431 12/2013
WO 2002026333 1/2002
(Continued)

OTHER PUBLICATIONS

Quest item—WoWWiki—Your guide to the World of Warcraft, printed from http://www.wowwiki.com/Quest_Item, Retrieved on Apr. 16, 2014, 1 page.

(Continued)

*Primary Examiner* — Tramar Harper
(74) *Attorney, Agent, or Firm* — Esplin & Associates, PC

(57) ABSTRACT

Facilitating entry and/or selection of one or more awards associated with a secondary game to increase the probability of obtaining a more desirable award. Access to a secondary game may be selectively provided, to players of an online game, to facilitate player participations in individual episodes of the secondary game. A set of potential awards may be obtained together with a set of award probabilities for the set of potential awards. Entry and/or selection of one or more of the potential awards in the set of potential awards to be removed from or replaced in the set of potential awards to create an adjusted set of potential awards, may be received from the player. A first potential may be selected based on the award probabilities and distributed to the first player for use within the online game.

18 Claims, 11 Drawing Sheets

Related U.S. Application Data continuation of application No. 17/102,228, filed on Nov. 23, 2020, now Pat. No. 11,270,555, which is a continuation of application No. 16/658,841, filed on Oct. 21, 2019, now Pat. No. 10,878,663, which is a continuation of application No. 14/145,722, filed on Dec. 31, 2013, now Pat. No. 10,482,713.

(56) References Cited

U.S. PATENT DOCUMENTS 5,933,813 A 8/1999 Teicher
5,964,660 A 10/1999 James
6,015,344 A 1/2000 Kelly
6,120,378 A 9/2000 Moody
6,142,472 A 11/2000 Kliebisch
6,190,225 B1 2/2001 Coleman
6,190,255 B1 2/2001 Thomas
6,193,606 B1 2/2001 Walker
6,347,996 B1 2/2002 Gilmore
6,402,619 B1 6/2002 Sato
6,511,068 B1 1/2003 Sklansky
6,561,904 B2 5/2003 Locke
6,604,008 B2 8/2003 Chudley
6,745,236 B1 6/2004 Hawkins
6,811,483 B1 11/2004 Webb
6,850,900 B1 2/2005 Hare
6,857,959 B1 2/2005 Nguyen
6,928,474 B2 8/2005 Venkatesan
7,076,453 B2 7/2006 Jammes
7,288,028 B2 10/2007 Rodriquez
7,381,133 B2 6/2008 Thomas
7,481,708 B2 1/2009 Baerlocher
7,533,336 B2 5/2009 Jaffe
7,660,740 B2 2/2010 Boone
7,682,239 B2 3/2010 Friedman
7,785,188 B2 8/2010 Cannon
7,813,821 B1 10/2010 Howell
7,819,749 B1 10/2010 Fish
7,945,802 B2 5/2011 Hamilton, II
7,959,507 B2 6/2011 Cannon
8,010,404 B1 8/2011 Wu
8,016,668 B2 9/2011 Hardy
8,047,909 B2 11/2011 Walker
8,057,294 B2 11/2011 Pacey
8,066,571 B2 11/2011 Koster
8,103,559 B2 1/2012 Bhogal
8,147,340 B2 4/2012 Brunetdecourssou
8,157,635 B2 4/2012 Hardy
8,187,101 B2 5/2012 Herrmann
8,226,472 B2 7/2012 Van Luchene
8,231,453 B2 7/2012 Wolf
8,231,470 B2 7/2012 Feeney
8,239,487 B1 8/2012 Hoffman
8,246,439 B2 8/2012 Kelly
8,272,934 B2 9/2012 Olive
8,272,951 B2 9/2012 Ganz
8,272,956 B2 9/2012 Kelly
8,277,312 B2 * 10/2012 Matthews ........... G07F 17/3295 463/16
8,282,491 B2 10/2012 Auterio
8,287,367 B2 10/2012 Hall
8,287,383 B1 10/2012 Etter
8,287,384 B2 10/2012 Auterio
8,292,743 B1 10/2012 Etter
8,313,372 B2 11/2012 Naicker
8,317,584 B2 11/2012 Aoki
8,317,601 B1 11/2012 Lucianojr
8,323,110 B2 12/2012 Shibamiya
8,328,642 B2 12/2012 Mosites
8,332,260 B1 12/2012 Mysen
8,332,544 B1 12/2012 Ralls
8,348,716 B2 1/2013 Ganz
8,348,762 B2 1/2013 Willis
8,348,767 B2 1/2013 Mahajan
8,348,768 B2 1/2013 Auterio
8,360,858 B2 1/2013 Larocca
8,360,867 B2 1/2013 Vanluchene
8,360,868 B2 1/2013 Shvili
8,366,544 B2 2/2013 Walker
8,366,550 B2 2/2013 Herrmann
8,371,925 B2 2/2013 Bonney
8,376,826 B2 2/2013 Katz
8,382,572 B2 2/2013 Hoffman
8,388,427 B2 3/2013 Yariv
8,401,913 B2 3/2013 Alivandi
8,408,989 B2 4/2013 Bennett
8,439,759 B1 5/2013 Mello
8,475,262 B2 7/2013 Wolf
8,506,394 B2 8/2013 Kelly
8,512,150 B2 8/2013 Herrmann
8,583,266 B2 11/2013 Herbrich
8,636,591 B1 1/2014 Hawk
8,696,428 B1 4/2014 Post
8,715,068 B2 5/2014 Arnone
8,777,754 B1 * 7/2014 Santini .................. G07F 17/326 705/80
8,784,214 B2 7/2014 Parks
8,790,185 B1 7/2014 Caldarone
8,821,260 B1 9/2014 Desanti
8,831,758 B1 9/2014 Chu
8,851,978 B1 10/2014 Koh
8,920,243 B1 12/2014 Curtis
8,961,319 B1 2/2015 Pieron
8,968,067 B1 3/2015 Curtis
9,138,639 B1 9/2015 Ernst
9,218,714 B2 12/2015 Arnone
9,257,007 B2 2/2016 Santini
9,508,222 B1 11/2016 Mclellan
9,675,891 B2 6/2017 Pieron
9,717,986 B1 8/2017 Kawaguchi
9,737,819 B2 * 8/2017 Desanti ................. A63F 13/822
9,962,605 B1 * 5/2018 Wei ....................... A63F 13/798
10,384,134 B1 8/2019 Caldarone
10,456,689 B2 10/2019 Pieron
10,482,713 B1 11/2019 Schultz
10,799,799 B2 10/2020 Kawaguchi
10,828,574 B2 11/2020 Tsao
10,878,663 B2 12/2020 Schultz
10,937,273 B2 3/2021 Caldarone
10,987,581 B2 4/2021 Pieron
11,058,954 B1 * 7/2021 Koh ........................ A63F 13/45
11,241,629 B2 2/2022 Tsao
11,270,555 B2 3/2022 Schultz
2002/0059397 A1 5/2002 Feola
2002/0072412 A1 6/2002 Young
2002/0094863 A1 7/2002 Klayh
2002/0095327 A1 7/2002 Zumel
2002/0115488 A1 8/2002 Berry
2002/0119824 A1 8/2002 Allen
2002/0151351 A1 10/2002 Baerlocher
2002/0165794 A1 11/2002 Ishihara
2002/0183105 A1 12/2002 Cannon
2002/0193162 A1 12/2002 Walker
2003/0008713 A1 1/2003 Ushiro
2003/0027619 A1 2/2003 Nicastro
2003/0032476 A1 2/2003 Walker
2003/0102625 A1 6/2003 Katz
2003/0109301 A1 6/2003 Chudley
2003/0157978 A1 8/2003 Englman
2003/0171148 A1 9/2003 Weitz
2003/0174178 A1 9/2003 Hodges
2003/0190960 A1 10/2003 Jokipii
2003/0216167 A1 11/2003 Gauselmann
2004/0002387 A1 1/2004 Grady
2004/0046800 A1 3/2004 Emerson
2004/0068451 A1 4/2004 Lenk
2004/0072615 A1 4/2004 Maya
2004/0185932 A1 9/2004 Lombardo
2004/0215524 A1 10/2004 Parkyn
2004/0219969 A1 11/2004 Casey
2004/0224745 A1 11/2004 Bregenzer
2004/0225387 A1 11/2004 Smith
2004/0267611 A1 12/2004 Hoerenz
2005/0096117 A1 5/2005 Katz

(56) References Cited

U.S. PATENT DOCUMENTS

| | | | |
|---|---|---|---|
| 2005/0114223 | A1 | 5/2005 | Schneider |
| 2005/0165686 | A1 | 7/2005 | Zack |
| 2005/0176498 | A1 | 8/2005 | Nguyen |
| 2005/0192087 | A1 | 9/2005 | Friedman |
| 2005/0209008 | A1 | 9/2005 | Shimizu |
| 2005/0227751 | A1 | 10/2005 | Zanelli |
| 2005/0255914 | A1 | 11/2005 | McHale |
| 2005/0277474 | A1 | 12/2005 | Barry |
| 2006/0030395 | A1 | 2/2006 | Thomas |
| 2006/0030407 | A1 | 2/2006 | Thayer |
| 2006/0063587 | A1 | 3/2006 | Manzo |
| 2006/0116194 | A1 | 6/2006 | Pacey |
| 2006/0116196 | A1 | 6/2006 | Vancura |
| 2006/0155597 | A1 | 7/2006 | Gleason |
| 2006/0200370 | A1 | 9/2006 | Ratliff |
| 2006/0217198 | A1 | 9/2006 | Johnson |
| 2006/0287029 | A1 | 12/2006 | Yoshinobu |
| 2006/0287102 | A1 | 12/2006 | White |
| 2007/0021213 | A1 | 1/2007 | Foe |
| 2007/0060314 | A1 | 3/2007 | Baerlocher |
| 2007/0060315 | A1 | 3/2007 | Park |
| 2007/0077988 | A1 | 4/2007 | Friedman |
| 2007/0111770 | A1 | 5/2007 | Van Luchene |
| 2007/0129139 | A1 | 6/2007 | Nguyen |
| 2007/0129147 | A1 | 6/2007 | Gagner |
| 2007/0167235 | A1 | 7/2007 | Naicker |
| 2007/0167239 | A1 | 7/2007 | Orourke |
| 2007/0191101 | A1 | 8/2007 | Coliz |
| 2007/0191102 | A1 | 8/2007 | Coliz |
| 2007/0197276 | A1 | 8/2007 | Sato |
| 2007/0213116 | A1 | 9/2007 | Crawford |
| 2007/0281285 | A1 | 12/2007 | Jayaweera |
| 2007/0287523 | A1 | 12/2007 | Esses |
| 2008/0009344 | A1 | 1/2008 | Graham |
| 2008/0015006 | A1 | 1/2008 | George |
| 2008/0032787 | A1 | 2/2008 | Low |
| 2008/0058092 | A1 | 3/2008 | Schwartz |
| 2008/0113706 | A1 | 5/2008 | OHalloran |
| 2008/0113815 | A1 | 5/2008 | Weingardt |
| 2008/0124353 | A1 | 5/2008 | Brodeur |
| 2008/0154798 | A1 | 6/2008 | Valz |
| 2008/0171599 | A1 | 7/2008 | Salo |
| 2008/0176625 | A1 | 7/2008 | Kelly |
| 2008/0194318 | A1 | 8/2008 | Kralicky |
| 2008/0200260 | A1 | 8/2008 | Deng |
| 2008/0207306 | A1 | 8/2008 | Higbie |
| 2008/0214295 | A1 | 9/2008 | Dabrowski |
| 2008/0227525 | A1 | 9/2008 | Kelly |
| 2008/0234043 | A1 | 9/2008 | McCaskey |
| 2008/0242421 | A1 | 10/2008 | Geisner |
| 2008/0248867 | A1 | 10/2008 | Englman |
| 2008/0275786 | A1 | 11/2008 | Gluck |
| 2008/0300045 | A1 | 12/2008 | Ratcliff |
| 2008/0318668 | A1 | 12/2008 | Ching |
| 2009/0011812 | A1 | 1/2009 | Katz |
| 2009/0017886 | A1 | 1/2009 | McGucken |
| 2009/0036199 | A1 | 2/2009 | Myus |
| 2009/0048918 | A1 | 2/2009 | Dawson |
| 2009/0061982 | A1 | 3/2009 | Brito |
| 2009/0124353 | A1 | 5/2009 | Collette |
| 2009/0143137 | A1 | 6/2009 | Asano |
| 2009/0181774 | A1 | 7/2009 | Ratcliff |
| 2009/0204907 | A1 | 8/2009 | Finn |
| 2009/0210301 | A1 | 8/2009 | Porter |
| 2009/0234710 | A1 | 9/2009 | Belgaied Hassine |
| 2009/0315893 | A1 | 12/2009 | Smith |
| 2010/0004048 | A1 | 1/2010 | Brito |
| 2010/0022307 | A1 | 1/2010 | Steuer |
| 2010/0035689 | A1 | 2/2010 | Altshuler |
| 2010/0041472 | A1 | 2/2010 | Gagner |
| 2010/0041481 | A1 | 2/2010 | Smedley |
| 2010/0050088 | A1 | 2/2010 | Neustaedter |
| 2010/0070056 | A1 | 3/2010 | Coronel |
| 2010/0090403 | A1 | 4/2010 | Miller |
| 2010/0094841 | A1 | 4/2010 | Bardwil |
| 2010/0099471 | A1 | 4/2010 | Feeney |
| 2010/0107214 | A1 | 4/2010 | Ganz |
| 2010/0113162 | A1 | 5/2010 | Vemuri |
| 2010/0174593 | A1 | 7/2010 | Cao |
| 2010/0198653 | A1 | 8/2010 | Bromenshenkel |
| 2010/0210356 | A1 | 8/2010 | Losica |
| 2010/0227675 | A1 | 9/2010 | Luxton |
| 2010/0227682 | A1 | 9/2010 | Reville |
| 2010/0228606 | A1 | 9/2010 | Walker |
| 2010/0240444 | A1 | 9/2010 | Friedman |
| 2010/0241491 | A1 | 9/2010 | Eglen |
| 2010/0241492 | A1 | 9/2010 | Eglen |
| 2010/0306015 | A1 | 12/2010 | Kingston |
| 2011/0065511 | A1 | 3/2011 | Mahan |
| 2011/0092271 | A1 | 4/2011 | Nguyen |
| 2011/0092273 | A1 | 4/2011 | Cerbini |
| 2011/0111841 | A1 | 5/2011 | Tessmer |
| 2011/0112662 | A1 | 5/2011 | Thompson |
| 2011/0113353 | A1 | 5/2011 | Koh |
| 2011/0118002 | A1 | 5/2011 | Aoki |
| 2011/0145040 | A1 | 6/2011 | Zahn |
| 2011/0151957 | A1 | 6/2011 | Falciglia |
| 2011/0218033 | A1 | 9/2011 | Englman |
| 2011/0227919 | A1 | 9/2011 | Bongio |
| 2011/0256921 | A1 | 10/2011 | Pacey |
| 2011/0256936 | A1 | 10/2011 | Walker |
| 2011/0263324 | A1 | 10/2011 | Ganetakos |
| 2011/0275438 | A9 | 11/2011 | Hardy |
| 2011/0281638 | A1 | 11/2011 | Bansi |
| 2011/0281654 | A1 | 11/2011 | Kelly |
| 2011/0282764 | A1 | 11/2011 | Borst |
| 2011/0294558 | A1 | 12/2011 | Kim |
| 2011/0300923 | A1 | 12/2011 | Vanluchene |
| 2011/0300926 | A1 | 12/2011 | Englman |
| 2011/0319152 | A1 | 12/2011 | Ross |
| 2011/0319170 | A1 | 12/2011 | Shimura |
| 2012/0011002 | A1 | 1/2012 | Crowe |
| 2012/0015714 | A1 | 1/2012 | Ocko |
| 2012/0015715 | A1 | 1/2012 | Luxton |
| 2012/0034961 | A1 | 2/2012 | Berman |
| 2012/0034973 | A1 | 2/2012 | Frank |
| 2012/0040743 | A1 | 2/2012 | Auterio |
| 2012/0040761 | A1 | 2/2012 | Auterio |
| 2012/0042282 | A1 | 2/2012 | Wong |
| 2012/0047002 | A1 | 2/2012 | Patel |
| 2012/0059730 | A1 | 3/2012 | Jensen |
| 2012/0083909 | A1 | 4/2012 | Carpenter |
| 2012/0094743 | A1 | 4/2012 | Odom |
| 2012/0101886 | A1 | 4/2012 | Subramanian |
| 2012/0108306 | A1 | 5/2012 | Munsell |
| 2012/0109785 | A1 | 5/2012 | Karlsson |
| 2012/0115593 | A1 | 5/2012 | Vann |
| 2012/0122589 | A1 | 5/2012 | Kelly |
| 2012/0129590 | A1 | 5/2012 | Morrisroe |
| 2012/0130856 | A1 | 5/2012 | Petri |
| 2012/0142429 | A1 | 6/2012 | Muller |
| 2012/0156668 | A1 | 6/2012 | Zelin |
| 2012/0157187 | A1 | 6/2012 | Moshal |
| 2012/0157193 | A1 | 6/2012 | Arezina |
| 2012/0166380 | A1 | 6/2012 | Sridharan |
| 2012/0166449 | A1 | 6/2012 | Pitaliya |
| 2012/0178514 | A1 | 7/2012 | Schulzke |
| 2012/0178515 | A1 | 7/2012 | Adams |
| 2012/0178529 | A1 | 7/2012 | Collard |
| 2012/0197874 | A1 | 8/2012 | Zatkin |
| 2012/0202570 | A1 | 8/2012 | Schwartz |
| 2012/0203669 | A1 | 8/2012 | Borsch |
| 2012/0215667 | A1 | 8/2012 | Ganz |
| 2012/0221430 | A1 | 8/2012 | Naghmouchi |
| 2012/0226573 | A1 | 9/2012 | Zakas |
| 2012/0231891 | A1 | 9/2012 | Watkins |
| 2012/0244945 | A1 | 9/2012 | Kolo |
| 2012/0244947 | A1 | 9/2012 | Ehrlich |
| 2012/0244950 | A1 | 9/2012 | Braun |
| 2012/0245988 | A1 | 9/2012 | Pace |
| 2012/0256377 | A1 | 10/2012 | Schneider |
| 2012/0282986 | A1 | 11/2012 | Castro |
| 2012/0283013 | A1 * | 11/2012 | Guo ...................... G06Q 30/02 463/31 |

(56) References Cited

U.S. PATENT DOCUMENTS

| | | | | |
|---|---|---|---|---|
| 2012/0289315 | A1 | 11/2012 | Van Luchene | |
| 2012/0289330 | A1 | 11/2012 | Leydon | |
| 2012/0289346 | A1 | 11/2012 | Vanluchene | |
| 2012/0295699 | A1 | 11/2012 | Reiche | |
| 2012/0296716 | A1 | 11/2012 | Barbeau | |
| 2012/0302329 | A1 | 11/2012 | Katz | |
| 2012/0302335 | A1 | 11/2012 | Gregory-Brown | |
| 2012/0309504 | A1 | 12/2012 | Isozaki | |
| 2012/0311504 | A1 | 12/2012 | Van Os | |
| 2012/0322545 | A1 | 12/2012 | Arnone | |
| 2012/0322561 | A1 | 12/2012 | Kohlhoff | |
| 2012/0330785 | A1 | 12/2012 | Hamick | |
| 2013/0005437 | A1 | 1/2013 | Bethke | |
| 2013/0005438 | A1 | 1/2013 | Ocko | |
| 2013/0005466 | A1 | 1/2013 | Mahajan | |
| 2013/0005473 | A1 | 1/2013 | Bethke | |
| 2013/0005475 | A1 | 1/2013 | Mahajan | |
| 2013/0005480 | A1 | 1/2013 | Bethke | |
| 2013/0006735 | A1 | 1/2013 | Koenigsberg | |
| 2013/0006736 | A1 | 1/2013 | Bethke | |
| 2013/0012304 | A1 | 1/2013 | Cartwright | |
| 2013/0013094 | A1 | 1/2013 | Parks | |
| 2013/0013326 | A1 | 1/2013 | Miller | |
| 2013/0013404 | A1 | 1/2013 | Suprock | |
| 2013/0013459 | A1 | 1/2013 | Kerr | |
| 2013/0029745 | A1 | 1/2013 | Kelly | |
| 2013/0059656 | A1 | 3/2013 | Kim | |
| 2013/0072278 | A1 | 3/2013 | Salazar | |
| 2013/0079087 | A1 | 3/2013 | Brosnan | |
| 2013/0090173 | A1 | 4/2013 | Kislyi | |
| 2013/0090750 | A1 | 4/2013 | Herrman | |
| 2013/0095914 | A1 | 4/2013 | Allen | |
| 2013/0123005 | A1 | 5/2013 | Allen | |
| 2013/0124361 | A1 | 5/2013 | Bryson | |
| 2013/0151342 | A1 | 6/2013 | Citron | |
| 2013/0173393 | A1 | 7/2013 | Calman | |
| 2013/0178259 | A1 | 7/2013 | Strause | |
| 2013/0196732 | A1* | 8/2013 | Oochi | A63F 13/69 463/17 |
| 2013/0210511 | A1 | 8/2013 | Larocca | |
| 2013/0217489 | A1 | 8/2013 | Bronstein Bendayan | |
| 2013/0226733 | A1 | 8/2013 | Evans | |
| 2013/0231182 | A1 | 9/2013 | Hall | |
| 2013/0237299 | A1 | 9/2013 | Bancel | |
| 2013/0244767 | A1 | 9/2013 | Barclay | |
| 2013/0288757 | A1 | 10/2013 | Guthridge | |
| 2013/0290147 | A1 | 10/2013 | Chandra | |
| 2013/0303276 | A1 | 11/2013 | Weston | |
| 2013/0310164 | A1 | 11/2013 | Walker | |
| 2013/0344932 | A1 | 12/2013 | Adams | |
| 2014/0004884 | A1 | 1/2014 | Chang | |
| 2014/0004955 | A1* | 1/2014 | Nahari | A63F 13/60 463/42 |
| 2014/0018156 | A1 | 1/2014 | Rizzotti | |
| 2014/0033262 | A1 | 1/2014 | Anders | |
| 2014/0038679 | A1 | 2/2014 | Snow | |
| 2014/0067526 | A1 | 3/2014 | Raju | |
| 2014/0067544 | A1 | 3/2014 | Klish | |
| 2014/0073434 | A1 | 3/2014 | Yukishita | |
| 2014/0073436 | A1 | 3/2014 | Takagi | |
| 2014/0087864 | A1 | 3/2014 | Togashi | |
| 2014/0089048 | A1 | 3/2014 | Bruich | |
| 2014/0100020 | A1 | 4/2014 | Carroll | |
| 2014/0106858 | A1 | 4/2014 | Constable | |
| 2014/0128137 | A1 | 5/2014 | Balise | |
| 2014/0157314 | A1 | 6/2014 | Roberts | |
| 2014/0206452 | A1 | 7/2014 | Bambino | |
| 2014/0243072 | A1 | 8/2014 | Santini | |
| 2014/0274359 | A1 | 9/2014 | Helava | |
| 2014/0295958 | A1 | 10/2014 | Shono | |
| 2014/0315616 | A1 | 10/2014 | Avin | |
| 2014/0329585 | A1 | 11/2014 | Santini | |
| 2014/0337259 | A1 | 11/2014 | Amb | |
| 2015/0011286 | A1 | 1/2015 | Kim | |
| 2015/0019349 | A1 | 1/2015 | Milley | |
| 2015/0031440 | A1 | 1/2015 | Desanti | |
| 2015/0065243 | A1 | 3/2015 | Mizrahi | |
| 2015/0087378 | A1 | 3/2015 | Louie | |
| 2015/0126269 | A1 | 5/2015 | Linden | |
| 2015/0141118 | A1* | 5/2015 | Lefebvre | G07F 17/3255 463/22 |
| 2015/0306494 | A1 | 10/2015 | Pieron | |
| 2015/0335995 | A1 | 11/2015 | Mclellan | |
| 2015/0352436 | A1 | 12/2015 | Pieron | |
| 2015/0356828 | A1 | 12/2015 | Caputo | |
| 2016/0110903 | A1 | 4/2016 | Perrin | |
| 2018/0353846 | A1 | 12/2018 | Nowak | |
| 2019/0143219 | A1 | 5/2019 | Kawaguchi | |
| 2019/0255447 | A1 | 8/2019 | Tsao | |
| 2019/0275422 | A1 | 9/2019 | Pieron | |
| 2019/0329137 | A1 | 10/2019 | Caldarone | |
| 2020/0051393 | A1 | 2/2020 | Schultz | |
| 2020/0406146 | A1 | 12/2020 | Kawaguchi | |
| 2020/0406151 | A1 | 12/2020 | Tsao | |
| 2021/0074124 | A1 | 3/2021 | Schultz | |
| 2021/0166528 | A1 | 6/2021 | Caldarone | |
| 2021/0275916 | A1 | 9/2021 | Pieron | |
| 2022/0143515 | A1 | 5/2022 | Tsao | |
| 2022/0148385 | A1 | 5/2022 | Schultz | |
| 2023/0030763 | A1 | 2/2023 | Kawaguchi | |
| 2023/0169827 | A1 | 6/2023 | Caldarone | |
| 2023/0321551 | A1 | 10/2023 | Tsao | |

FOREIGN PATENT DOCUMENTS

| | | |
|---|---|---|
| WO | 2013013281 | 1/2013 |
| WO | 2013059639 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

(56) References Cited

OTHER PUBLICATIONS

"I don't have enough resources/builders to upgrade anything in my village, what can I do?" gamesupport.supercell.net.Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index php/t-43273.html, Oct. 24, 2011, 23 pages.
"Lotro Store" written by Elinnea, published on Dec. 15, 2011 and printed from URL <http://lotrowiki.com/index.php ?title=LOTRO _ Store&oldid=396550>, 23 pages.
"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, Links are to used articles, 28 pages.
"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_-_Part_2&oldid=399366, http://lotro-wiki.com/index.php?title=Getting_Started&oldid=349681, Links are to used articles, 33 pages.
"Main Page" written by Starbusty, published on Dec. 12, 2011 and printed from URL <http://lotrowiki.com/index.php?title=Main_Page &oldid=394429>, 2 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_-_Part_ 1 &oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_-_Part_2&oldid=399366>, 2 pages.
"Rest—WoWWiki—Your guide to the World of Warcraft", printed from http://www.wowwiki.com/Rest, May 19, 2014, 2 pages.
"Treasure Chest Game" written by Zelda Wiki, the Zelda encyclopedia; published on or before Oct. 17, 2012; accessible andprinted from URL http://web.archive.org/web/20121017085058/http://zeldawiki.org/Treasure_Chest_Game>, 4 pages.
"Warcraft II: Tides of Darkness". Wikipedia.org. Online. Accessed via the Internet. Accessed Aug. 9, 2014. <URL: http://en.wikipedia.org/wiki/Warcraft_II :_Tides_of_Darkness>, 10 pages.
<http://lotro-wiki.com/index.php?title=Ouest:A_Little_Extra_Never_Hurts_-_Part_2&oldid=399366>, <http://lotrowiki.com/index.php ?title=Getting_ Started&oldid=349681 > Links are to used articles. (7 pgs) Feb. 26, 2014.
City Coins. CityVille Wikia. Online. Accessed via the Internet. Accessed Aug. 9, 2014. <URL: http://cityville.wikia.com/wiki/City_Coins>, 2 pages.
Diablo 2, Blizzard Entertainment, Mar. 23, 2009, manual and on line website http:/web.archive.org/web/20090323171356/http://classic.battle.net/diablo2exp/items/basics.shtml (4 pages).
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 8 pages.
Elsword—Wikipedia, the free encyclopedia, URL: en.wikipedia.org/wiki/Elsword [Retrieved Feb. 21, 2013], 6 pages.
Elsword, Dec. 27, 2007, KOG Studios, guide posted Mar. 17, 2011 https ://web.archive.org/web/20110509033123/http ://forums.elswordon 1 ine.com/Topic5673.aspx, http://en.wikipedia.org/wiki/Elsword (9 pages).
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Gem System—Street Fighter X Tekken, http://www.streetfighter.com/us/sfxtk/features/gem-system, printed Nov. 6, 2012, 6 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
New Feature: Tiered Tournaments and Tournament Updates, printed from http://community.kabam.com/forums/showthread php?171349-New-Feat on Feb. 11, 2014, 2 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
Super Mario Bros. 3 Review, The Mean Machines Archives, Nintendo for NES, Feb. 1990, pp. 1-4 (Year: 1990).
Super Mario Bros. 3, NES Gameplay, http://www.youtube.com/watch?v=82TL-Acm4ts, Published on Mar. 14, 2009, 1 page.
Super Mario Bros. 3, StrategyWiki, the video game walkthrough and strategy guide, http://strategywiki.org/wiki/Super_Mario_Bros._ 3, Oct. 2, 2012, 4 pages.
TFF Challenge—UC Davis, http://tffchallenge.com/team/uc-davis/, printed Jan. 15, 2014, 12 pages.
TFWiki "teamfortress wiki" available Nov. 5, 2011 retrieved from https://web.archive.org/web/20111105044256/http://wiki.teamfortress.com/wiki/Loadout, 4 pages.

(56) References Cited

OTHER PUBLICATIONS

The Arreat Summit—Items: Basic Item Information, URL: web.archive.org/web/20090323171356/http://classic.battle.net/diablo2exp/items/basics.shtml [Retrieved Feb. 21, 2013], 3 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.
Super Mario Bros. 3 Review, Nintendo for NES, pp. 1-4 (Year: 1990).

* cited by examiner

SYSTEM AND METHOD FOR FACILITATING A SECONDARY GAME

FIELD

The disclosure generally relates to implementing a secondary game, and more specifically, to facilitating selection and/or entry of one or more awards.

BACKGROUND

In various online games, players are provided a secondary game in which they have an opportunity to win one or more virtual items. Such virtual items may be usable within the online game. After a prize from the secondary game has been awarded, the players may return to playing the primary game.

SUMMARY

One aspect of the disclosure relates to implementing a secondary game within an online game. The secondary game may be a turn-based game, chance-based game, and/or other game types.

The secondary game may commence with a set of one or more potential awards or prizes. The set of one or more potential awards or prizes may comprise awards or prizes having different, real, or perceived values to the user. For example, where the award or prize is a virtual item already possessed by the user, the award or prize may have a low value to the user compared to a virtual item that the user does not possess. Similarly, if the award or prize is a rare virtual item it may have a relatively high perceived or real value to the user, regardless of whether the user possesses the virtual item or not.

Where the set of one or more potential awards or prizes comprises awards or prizes having a relatively low value to the user, the user may be discouraged from playing the secondary game. If a turn of the secondary game has an associated user cost, this may be especially true. If the set of one or more awards or prizes is dominated by low-value items (e.g., items having perceived and/or values that are relatively low), the user may decide that the risk of losing the associated user cost of a turn of the secondary game outweighs the potential gain from winning an award or prize. Therefore users may be discouraged from taking repeated turns of the secondary game.

Users of the secondary game may be provided with an opportunity to enter and/or select one or more potential awards or prizes in the set of one or more potential awards or prizes to be removed from the set and/or replaced by other awards or prizes. As a result, the user may remove less desirable prizes from the set of potential awards or prizes, increasing the probability that they will win a more desirable award or prize when taking a turn of the secondary game. Selection and/or entry of prizes or awards to be removed and/or replaced from the set of potential awards may have an associated user cost. The amount of the associated user cost may be based on a determined value of the specific award or prize selected and/or entered for removal or replacement by the user.

By allowing users to remove less desirable prizes or awards from the set of potential prizes or awards, the user may perceive that they have a better chance of winning a more desirable prize or award, and therefore may be incentivized to take repeated turns of the secondary game. Where the turns of the secondary game have an associated user cost, and/or when the selection and/or entry of prizes or awards from a set of potential prizes or awards has an associated user cost, incentivizing users to take repeated turns of the turn based game may increase monetization of the secondary game.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms. The server(s) and/or client computer platforms may be configured to execute one or more computer program components to provide recommendations to users. The computer program components may include one or more of a game component, a secondary game component, a user component, an administrator component, and/or other components.

As used throughout the specification, the terms user and player may be used interchangeably and their use in conjunction with any particular aspect of the disclosure is not intended to be limiting.

The game component may be configured to execute an instance of online game and to implement the instance of the online game by receiving and executing commands in the instance of the online game to facilitate player participation in the online game. The game component may be configured to facilitate presentation of the online game on client computing platforms and/or other platforms to users of the online game accessing the online game through client computing platforms associated with the users.

The user component may be configured to store inventories of items that are available to the users of the online game. The inventories may include a first inventory of items available to a first user of the online game. The items may include a virtual item and/or any other item. A virtual item may be an item that can be used in the online game by the user. For example, a virtual item may be used to assist a user's character in progression through the online game, and/or in other ways. Examples of virtual items may include, but are not limited to: resources, currency, valuables (money, valuable metals or gems, etc.), weapons, spell components, defense components, armor, mounts, pets, attire, power ups, achievement icons, awards, and/or other items.

The secondary game component may be configured to selectively provide access to the players of a secondary game to facilitate player participations in individual episodes of the secondary game. Individual episodes may include one or more players. For an episode provided to a first player, the secondary game may be configured to obtain a set of potential awards for the episode, and provide a first turn to the first player. The individual potential awards may include virtual items usable in the online game. For the first turn, the secondary game component may be configured to obtain a set of award probabilities for the set of potential awards. For the first turn, the secondary game component may be configured to effectuate presentation of an interface to the first player, the interface being configured to receive entry and/or selection of one or more of the potential awards in the set of potential awards to be removed from or replaced in the set of potential awards to create an adjusted set of potential awards.

For the first turn, the secondary game component may be configured to stochastically or quasi-stochastically, select a first potential award from the adjusted set of potential awards as an actual award for distribution for the first turn based on the award probabilities. The secondary game component may be configured to distribute the first potential award to the first player for use within the online game.

For an additional turn of the secondary game provided to the first player, the secondary game may be configured to obtain a set of probabilities for the set of adjusted potential awards minus the distributed first potential award. For the additional turn, the secondary game may be configured to effectuate presentation of an interface to the first player, the interface being configured to receive entry and/or selection of one or more of the potential awards in the adjusted set of potential awards to be removed from, or replaced in, the adjusted set of potential awards to create a second adjusted set of potential awards. For the additional turn, the secondary game may be configured to stochastically or quasi-stochastically, select a second potential award from the second adjusted set of potential awards as an actual award for distribution for the second turn based on the award probabilities. The secondary game component may be configured to distribute the second potential award to the first player for use within the online game.

Entry and/or selection, of the one or more potential awards in the adjusted set of potential awards to be removed from, or replaced in, the adjusted set of potential awards, may have an associated user cost based on values of individual ones of the potential awards in the adjusted set of potential awards.

The interface may be configured to indicate one or more user costs associated with entry and/or selection of the one or more potential awards in the set of potential awards to be removed from, or replaced in, the set of potential awards. The one or more user costs may be an amount of virtual currency, an amount of real world currency, a virtual item, an achievement in the online game and/or other user costs. The user cost associated with entry and/or selection of one or more potential awards in the set of potential awards may be based on a number of different factors. The associated user cost may be variable between different players of the secondary game and/or variable between turns of the secondary game. In other embodiments, the associated user cost may be constant across all users and all turns.

The associated user cost, with entry and/or selection of the one or more potential awards in the set of potential awards to be removed from or replaced in the set of potential awards, may be determined based on a value of individual ones of the potential awards in the set of potential awards. For example, where the set of potential awards comprises awards with a relatively high determined value, in the aggregate, the associated user cost may be relatively high, compared to a set of potential awards comprising awards with a relatively low determined value, in the aggregate.

The associated user cost may be determined based on the specific potential award or potential awards to be removed from, or replaced in, the set of potential awards. For example, if the specific potential award or potential awards selected and/or entered by the player to be removed from, or replaced in, the set of potential awards have a relatively high determined value, then the associated user cost may be relatively high compared to if the specific potential award or potential awards selected and/or entered by the player to be removed from or replaced in the set of potential awards has a relatively high determined value.

The associated user cost may be determined based on an indication of the potential awards in the adjusted set of potential awards once a potential award has been selected and/or entered for removal. For example, after the player provided an indication of which awards in the set of potential awards are desired to be removed or replaced, a value for the remaining awards may be determined which dictates the associated user cost to the user. Also, the associated user cost may be determined based on the number of individual prizes or awards in the set of potential awards.

The determined value of the individual prizes or awards and the set of potential awards may be based on a set of parameters specific to the user, or may be based on a set of parameters associated with the online game and/or the users of the online game as a whole. Parameters specific to the user may include demographic parameters of the user, an indication of the virtual items held in the inventory of the user, an indication of the purchase history of the user, an indication of the amount of virtual currency held in credit of the user, an indication of the number of times the user has played one or more secondary games, an indication of the amount of virtual currency, virtual items, real world currency, and/or other items of value expended by the user in playing one or more secondary games, and/or other parameters associated with the user. Parameters associated with the online game as a whole may include the amount of a specific award in the set of potential awards possessed by the users of the online game, the rarity of a specific award in the online game, an amount of effort required to obtain a specific award outside of the secondary game in the online game, and/or other parameters associated with the online game.

Each turn of the secondary game may have an associated user cost. The secondary game component may be configured to determine the associated user cost for one or more additional turns based on the remaining potential awards. The remaining potential award may be the set of potential awards minus distributed potential awards and/or any other awards.

The secondary game component may be configured to obtain the set of award probabilities by determining the set of award probabilities based on a value of the remaining potential awards. The remaining potential award may be the set of potential awards minus the distributed potential awards and/or any other awards. The secondary game component may be configured to obtain the set of award probabilities by determining the set of award probabilities for the second turn based on the value of the first potential award and/or any other awards. The secondary game component may be configured to provide additional turns to the player until the set of potential awards and/or any other awards have been distributed.

The secondary game component may be configured to provide additional turns to the player for a higher cost than each prior individual turn and/or any other turn. The secondary game component may be configured to provide additional turns to the player for a lower cost than each prior individual turn and/or any other turn.

The administrator component may be configured to facilitate selection and/or entry by an administrator of the individual potential awards to be included in the set of potential awards. The set of potential awards may be entered and/or selected by an administrator. The set of award probabilities for the set of potential awards may be selected and/or entered by an administrator. The administrator component may be configured to facilitate selection and/or entry of one or more parameters, by an administrator, associated with the secondary game. Such parameters may include, but not be limited to, how many items are included in the set of potential awards, the number of items that may be removed from or replaced in the set of potential awards by the user, the user cost associated with the user selecting and/or entering individual ones of items to be removed from or replaced in the set of potential awards, an amount of time that the items removed from or replaced in the set of potential awards by the user are reintroduced into the set of potential awards, and or other parameters.

The items removed from or replaced in the set of potential awards by a user may reappear in the set of potential awards after an obtained amount of time has elapsed since the user removed or replaced the item. The user may be provided a notification of the amount of time elapsed since removing an item and/or remaining until an item reappears in the set of potential awards. Limiting the amount of time that individual ones of the items in the set of potential awards remain removed or replaced may provide an incentive to the user to take multiple turns of the secondary game in order to take advantage of the improved probability of obtaining the desirable items.

The administrator component may be configured to facilitate selection and/or entry, by an administrator, of items to include in a mystery set of one or more potential awards, such as a mystery box.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
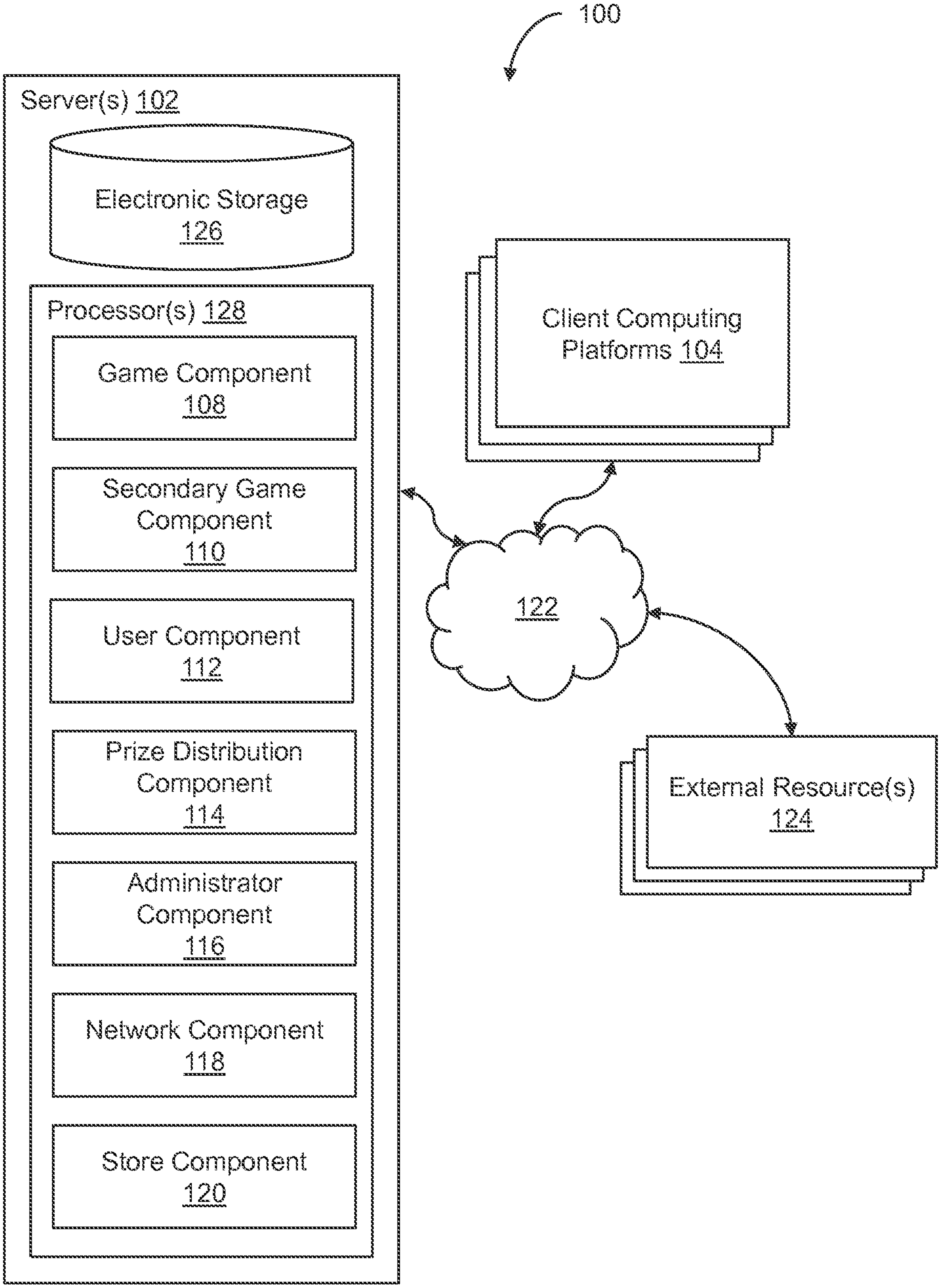
FIG. 1 illustrates an exemplary system configured to facilitate providing a secondary game within an online game, according to an aspect of the invention.

FIG. 1 illustrates a system 100 configured to facilitate providing a secondary game within an online game, according to an aspect of the invention. In some implementations, system 100 may include a server(s) 102. The server(s) 102 may host a game space in which an online game takes place. The server(s) 102 may be configured to communicate with one or more client computing platform(s) 104 according to a client/server architecture. The players may access system 100 and/or the virtual space via client computing platform(s) 104.

The system 100 may be configured to facilitate the removal or replacement of items from a set of one or more potential awards or prizes for the secondary game, thereby increasing the odds of obtaining one or more of the remaining items in the set of potential awards or prizes and incentivizing the user to continue playing the secondary game.

The server(s) 102 may be configured to execute one or more computer program components. The computer program components may include one or more of a game component 108, a secondary game component 110, a user component 112, a prize distribution component 114, an administrator component 116, a network component 118, a store component 120 and/or any other components.

The system may comprise a user component 112 configured to store inventories of virtual items that are available to players in the game space. The inventories may include a first inventory and/or any other inventory of virtual items available to a first player in the game space.

The user component 112 may be configured to access and/or manage one or more player profiles and/or player information associated with players of the system 100. The one or more player profiles and/or player information may include information stored by server(s) 102, one or more of the client computing platform(s) 104, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a client computing platform identification associated with a player, a phone number associated with a player, and/or other information related to players.

The user component 112 may be configured to store inventories of virtual items including resources that are available to players in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (e.g., money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The player maintains an inventory for the player's character in which virtual awards may be collected. The inventory may be accessed through an interface. As the character or other entity progresses through the game it may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, may be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game component 108 may be configured to execute an instance of online game and to implement the instance of the online game by receiving and executing commands in the instance of the online game to facilitate player participation in the online game. The game component 108 may be configured to facilitate presentation of the online game on client computing platforms 104 and/or other platforms to users of the online game accessing the online game through client computing platforms 104 associated with the users.

The game instance may be used to facilitate presentation of views of the game space to players. The game instance may be configured to facilitate interaction of the players with the game space and/or each other by performing operations in the game instance in response to commands and/or any other input received from the players.

The game component 108 may be configured to implement the instance of the virtual space executed by the computer components to determine the state of the virtual space. The state may then be communicated (e.g., via streaming visual data, via object/position data, and/or other state information) from server(s) 102 to client computing platform(s) 104 for presentation to players. The state determined and transmitted to a given client computing platform(s) 104 may correspond to a view for a player character being controlled by a player via the given client computing platform(s) 104. The state determined and transmitted to a given client computing platform(s) 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The instance of the virtual space may comprise a simulated space that is accessible by players via clients (e.g., client computing platform(s) 104) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which the state of the virtual space is determined by game component 108 is not intended to be limiting. The game component 108 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 108, players may control characters, objects, simulated physical phenomena (e.g., wind, rain, earthquakes, and/or other phenomena), and/or other elements within the virtual space to interact with the virtual space and/or each other. The player characters may include avatars. As used herein, the term "player character" may refer to an object (or group of objects) present in the virtual space that represents an individual player. The player character may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

The players may participate in the instance of the virtual space by controlling one or more of the available player controlled elements in the virtual space. Control may be exercised through control inputs and/or commands input by the players through client computing platform(s) 104. The players may interact with each other through communications exchanged within the virtual space. Such communications may include one or more of textual chat, instant messages, private messages, voice communications, and/or other communications. Communications may be received and entered by the players via their respective client computing platform(s) 104. Communications may be routed to and from the appropriate players through server(s) 102 (e.g., through game component 108).

The secondary game component 110 may be configured to selectively provide access to the players of a secondary game to facilitate player participations in individual episodes of the secondary game. Individual episodes may include one or more players. For an episode provided to a first player, the secondary game may be configured to obtain a set of potential awards for the episode, and provide a first turn to the first player. The individual potential awards may include virtual items usable in the online game. For the first turn, the secondary game component may be configured to obtain a set of award probabilities for the set of potential awards.

For the first turn, the secondary game component 110 may be configured to effectuate presentation of an interface to the first player, the interface being configured to receive entry and/or selection of one or more of the potential awards in the set of potential awards to be removed from or replaced in the set of potential awards to create an adjusted set of potential awards. For the first turn, the secondary game component 110 may be configured to stochastically or quasi-stochastically, select a first potential award from the adjusted set of potential awards as an actual award for distribution for the first turn based on the award probabilities. The secondary game component 110 may be configured to distribute the first potential award to the first player for use within the online game.

The individual potential awards may include virtual items usable in the online game. For the first turn, the secondary game component 110 may be configured to obtain a set of award probabilities for the set of potential awards (e.g., on a per-potential award basis).

The potential awards may include premium items highly sought after in the online game, items that may be used to augment and/or enhance other items, such as items rewarded by the events within the online game, improvements to one or more player parameters, virtual services (e.g., enhanced graphics of the online game provided to the players), and/or any other awards that may be provided through the secondary game. The individual potential awards for the secondary game may be predetermined by the provider, administrator, moderator, and/or any other entities related to the online game at a configuration stage of the system. Simultaneously or alternatively, the individual potential awards may be determined dynamically during the instance of the online by the provider, administrator, moderator, and/or any other entities related to online game. In some examples, the potential awards of the secondary game may be dynamically determined based on one or more items rewarded by events in the online game.

For an additional turn of the secondary game provided to the first player, the secondary game may be configured to obtain a set of probabilities for the set of adjusted potential awards minus the distributed first potential award. For the additional turn, the secondary game may be configured to effectuate presentation of an interface to the first player, the interface being configured to receive entry and/or selection of one or more of the potential awards in the adjusted set of potential awards to be removed from or replaced in the adjusted set of potential awards to create a second adjusted set of potential awards. For the additional turn, the secondary game may be configured to stochastically or quasi-stochastically, select a second potential award from the second adjusted set of potential awards as an actual award for distribution for the second turn based on the award probabilities. The secondary game component 110 may be configured to distribute the second potential award to the first player for use within the online game.

The secondary game component 110 may be configured to effectuate presentation of an offer to the first player for the one or more additional turns of the episode. The offer may include a cost for the one or more additional turns. Presentation of the offer may be effectuated based on completion of the first turn. Responsive to the first player accepting the offer and reception of payment of the cost from the first player, the secondary game component 110 may provide one or more additional turns of the episode to the first player.

Entry and/or selection, of the one or more potential awards in the adjusted set of potential awards to be removed from, or replaced in, the adjusted set of potential awards, may have an associated user cost based on values of individual ones of the potential awards in the adjusted set of potential awards.

The interface may be configured to indicate one or more user costs associated with entry and/or selection of the one or more potential awards in the set of potential awards to be removed from, or replaced in, the set of potential awards. The one or more user costs may be an amount of virtual currency, an amount of real world currency, a virtual item, an achievement in the online game, and/or other user costs. The user cost associated with entry and/or selection of one or more potential awards in the set of potential awards cost may be based on a number of different factors. The associated variable between different players of the secondary game and/or variable between turns of the secondary game. In other embodiments, the associated user cost may be constant across all users and all turns.

The associated user cost, with entry and/or selection of the one or more potential awards in the set of potential awards to be removed from, or replaced in, the set of potential awards, may be determined based on a value of individual ones of the potential awards in the set of potential awards. For example, where the set of potential awards comprises awards with a relatively high determined value, in the aggregate, the associated user cost may be relatively high, compared to a set of potential awards comprising awards with a relatively low determined value, in the aggregate.

The associated user cost may be determined based on the specific potential award or potential awards to be removed from, or replaced in, the set of potential awards. For example, if the specific potential award or potential awards selected and/or entered by the player to be removed from, or replaced in, the set of potential awards have a relatively high determined value, then the associated user cost may be relatively high compared to if the specific potential award or potential awards selected and/or entered by the player to be removed from, or replaced in, the set of potential awards has a relatively high determined value.

The associated user cost may be determined based on an indication of the potential awards in the adjusted set of potential awards once a potential award has been selected and/or entered for removal. For example, after the player provided an indication of which of the awards in the set of potential awards are desired to be removed or replaced, a value for the remaining awards may be determined which dictates the associated user cost to the user. Also, the associated user cost may be determined based on the number of individual prizes or awards in the set of potential awards.

The determined value of the individual prizes or awards and the set of potential awards may be based on a set of parameters specific to the user, or may be based on a set of parameters associated with the online game and/or the users of the online game as a whole. Parameters specific to the user may include demographic parameters of the user, an indication of the virtual items held in the inventory of the user, an indication of the purchase history of the user, an indication of the amount of virtual currency held in credit of the user, an indication of the number of times the user has played one or more secondary games, an indication of the amount of virtual currency, virtual items, real world currency, and/or other items of value expended by the user in playing one or more secondary games, and/or other parameters associated with the user. Parameters associated with the online game as a whole may include the amount of a specific award in the set of potential awards possessed by the users of the online game, the rarity of a specific award in the online game, an amount of effort required to obtain a specific award outside of the secondary game in the online game, and/or other parameters associated with the online game.

Each turn of the secondary game may have an associated user cost. The secondary game component 110 may be configured to determine the associated user cost for one or more additional turns based on potential awards included in the set of remaining potential awards. The associated user cost may be determined based on the real or perceived value of the items remaining and/or the item awarded to the user on the previous turn and/or the current turn. In some implementations, the greater the value of the remaining items and/or items awarded, the greater the cost to the player for an additional turn. In some implementations, the greater the value of the items left and/or items awarded, the lower the cost to the player for an additional turn. In some implementations, the lower the value of the remaining items and/or items awarded, the greater the cost to the player for additional turns. In some implementations, the lower the value of the remaining items and/or items awarded, the lower the cost for additional turns. In some implementations, the cost for additional turns may be randomly determined. In some implementations, an administrator may determine the cost for additional turns. In some implementations, the player may be awarded free turns, which can be used during the secondary game being currently played and/or at a later time. In some implementations, the player may be provided the opportunity to purchase a bundle of turns at a discount rate (e.g., purchasing five turns for a cost lower than purchasing the turns individually). In some implementations, players may share purchased turns with other players. In some implementations, players may share the items awarded with other players. The secondary game component 110 may be configured to determine the set of award probabilities based on the values of remaining potential awards. The remaining potential award may be the set of potential awards minus distributed potential awards and/or any other awards. In some implementations, the higher value items may have a higher and/or lower probability. In some implementations, the lower value items may have a higher and/or lower probability. In some implementations, the award probabilities may be determined based on algorithm. In some implementations, the award probabilities may be determined based on a lookup table. In some implementations, the award probabilities may be randomly determined. In some implementations, an operator may determine the award probabilities. In some implementations, the award probabilities may be based on player account information (e.g., depend on the player level, might, etc.). In some implementations, the award probabilities may be determined based on idle time periods during the day and/or any other time periods. In some implementations, the award probabilities may be determined based on player team information. In some implementations, the award probabilities may be determined based on in-game tournaments, and/or any other in-game promotional events.

The secondary game component 110 may be configured to determine the set of award probabilities for the second turn based on the value of the first potential award and/or any other awards. The secondary game component 110 may be configured to provide additional turns to the player until the set of potential awards and/or any other awards have been distributed. In other implementations, each time the secondary game component 110 distributes an award to the player, an additional item is included in the set of potential award for the one or more additional turns to replace the distributed award.

In an individual turn of the secondary game, a given player may engage in the gameplay provided by the secondary game to win one or more of the potential awards. For determining an outcome of the individual turn of the secondary game, the secondary game component 110 may be configured to stochastically or quasi-stochastically select one of the potential awards as an actual award for distribution to the given player as a result of the gameplay engaged in by the given player based on the award probabilities with the individual ones of the potential awards. In some examples, the gameplay provided by the secondary game may include chance-based gameplay, such as random player selection, random automatic selection, dice, wheel spinning, roulette, spinning tops, card drawing, lottery, and/or any other chance-based gameplays. By way of a non-limiting example, in one instance, the secondary game may include a wheel spin gameplay, wherein for an individual turn, a player may spin the wheel (as simulated by the secondary game component 110) to win potential awards provided by the secondary game. In that instance, to simulate the wheel spin gameplay for the individual turn, the secondary game component 110 obtains a set of award probabilities associated with the individual potential rewards (e.g., 10% of chance the wheel stops at a top award, 20% stops at the second top award, and so on). With the obtained award probabilities and the potential awards, the secondary game component 110 may simulate the wheel spin for the individual turn and select an actual award from the potential awards according to the stopping point of the wheel. In some exemplary implementations, the secondary game component 110 may employ a dice function for effectuating such simulation such that the inputs of the dice function are the potential award set and the award probabilities and the output is an actual award.

In response to the selection of the actual award for the individual turn, the secondary game component 110 may be configured to effectuate distribution of the selected actual award to the player engaging in the individual turn. This may involve distributing the actual award to the inventory of the player.

By way of a non-limiting example, a player may preview a set of prizes (e.g., A, B, C, D and E) available to the player prior to the start of the game. The prizes may be placed into identical containers and then randomized. The player may then choose to select a container to be opened, and the player may win the prize associated with the particular container. With four remaining containers, the player may choose to open a second container. The cost of opening the second container may be higher than the cost of opening the first container. The cost of opening the first container may be free. The player may be provided the option to open all of the containers individually, the cost of each turn may increase each time the player selects another container. The player is guaranteed to win all of the prizes (e.g., A, B, C, D and E) as long as the player pays for each additional prize. The order of the items revealed by the container opening may be predetermined and/or certain items may have a greater probability of being selected early in the selection process. The player may have the option to continue playing the secondary game by purchasing further selections, or return to the primary game.

The network component 118 may be configured to facilitate maintaining a connection to the one or more client computing platform(s) 104. For example, the network component 118 may facilitate maintaining one or more communication lines or ports to enable connection and/or exchange of information with a network 122 and/or other computing platform(s) 104. Information such as state information, game state and game logic may be communicated via network component. The network component 118 may be configured to receive information from the client computing platform(s) 104 as well.

The store component 120 may be configured to present a store interface to the players. The store interface may present offers to players to buy item instances of virtual items. The virtual items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store component 120 may be configured to effectuate presentation to the players of offers to purchase resources. The offers may include a first offer for the first player to purchase a first set of one or more virtual items. The virtual items may include a virtual good, a virtual currency, and/or other virtual items as described above. For example, the store component may be configured such that the offers presented to the first player may be restricted to offers having prices in a first price range. The first price range may be determined based on the player metric for the first player, and/or the player metric for other players. The store component 120 may be configured such that the first price range may change as participation by the first player in the game causes the player metric for the first player to change. The store component 120 may be configured such that the first price range may be bounded by one or more both of a minimum value and/or a maximum value. The store component 120 may be configured such that the offers having prices below the minimum value may not be available for purchase by the first player. The store component 120 may be configured such that offers having prices above the maximum value may be locked. This may mean the offers having prices above the maximum value may be unavailable for purchase by the first player independent from whether the first player has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

The server(s) 102, client computing platform(s) 104, and/or external resource(s) 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resource(s) 124 may be operatively linked via some other communication media.

The server(s) 102 may include electronic storage 126, one or more processors 128, and/or other components. Server(s) 102 may include communication lines, or ports to enable the exchange of information with a network 122 and/or other computing platforms 104. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables game server(s) 12 to function as described herein.

Processor(s) 128 is configured to provide information processing capabilities in server(s) 102. As such, processor (s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. The processor (s) 128 may be configured to execute components 108, 110, 112, 114, 116, 118, 120 and/or other components. Processor (s) 128 may be configured to execute components 108, 110, 112, 114, 116, 118, 120 and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118 and 120 are illustrated in FIG. 1 as being implemented within a single processing unit, in implementations in which processor includes multiple processing units, one or more of components 108, 110, 112, 114, 116, 118, 120 and/or other components may be implemented remotely from the other components. The description of the functionality provided by the different components 108, 110, 112, 114, 116, 118, 120 and/or other components described below is for illustrative purposes, and is not intended to be limiting, as any of components 108, 110, 112, 114, 116, 118, 120 and/or other components may provide more or less functionality than is described. For example, one or more of components 108, 110, 112, 114, 116, 118, 120 and/or other components may be eliminated, and some or all of its functionality may be provided by other ones of components 108, 110, 112, 114, 116, 118, 120 and/or other components. As another example, processor(s) 128 may be configured to execute one or more additional components that may perform some or all of the functionality attributed below to one of components 108, 110, 112, 114, 116, 118, 120 and/or other components.

A given client computing platform(s) 104 may include one or more processors configured to execute computer program components. The computer program components may be configured to enable an expert or player associated with the given client computing platform(s) 104 to interface with system 100, server(s) 102, and/or external resource(s) 124, and/or provide other functionality attributed herein to client computing platform(s) 104. By way of non-limiting example, the given client computing platform(s) 104 may include one or more of a desktop computer, a laptop computer, a handheld computer, a tablet computing platform, a NetBook, a Smartphone, a gaming console, and/or other computing platforms.

External resource(s) 124 may include sources of information, hosts and/or providers of virtual spaces outside of system 100, external entities participating with system 100, and/or other resources. In some implementations, some or all of the functionality attributed herein to external resource (s) 124 may be provided by resources included in system 100.

Figure 2:
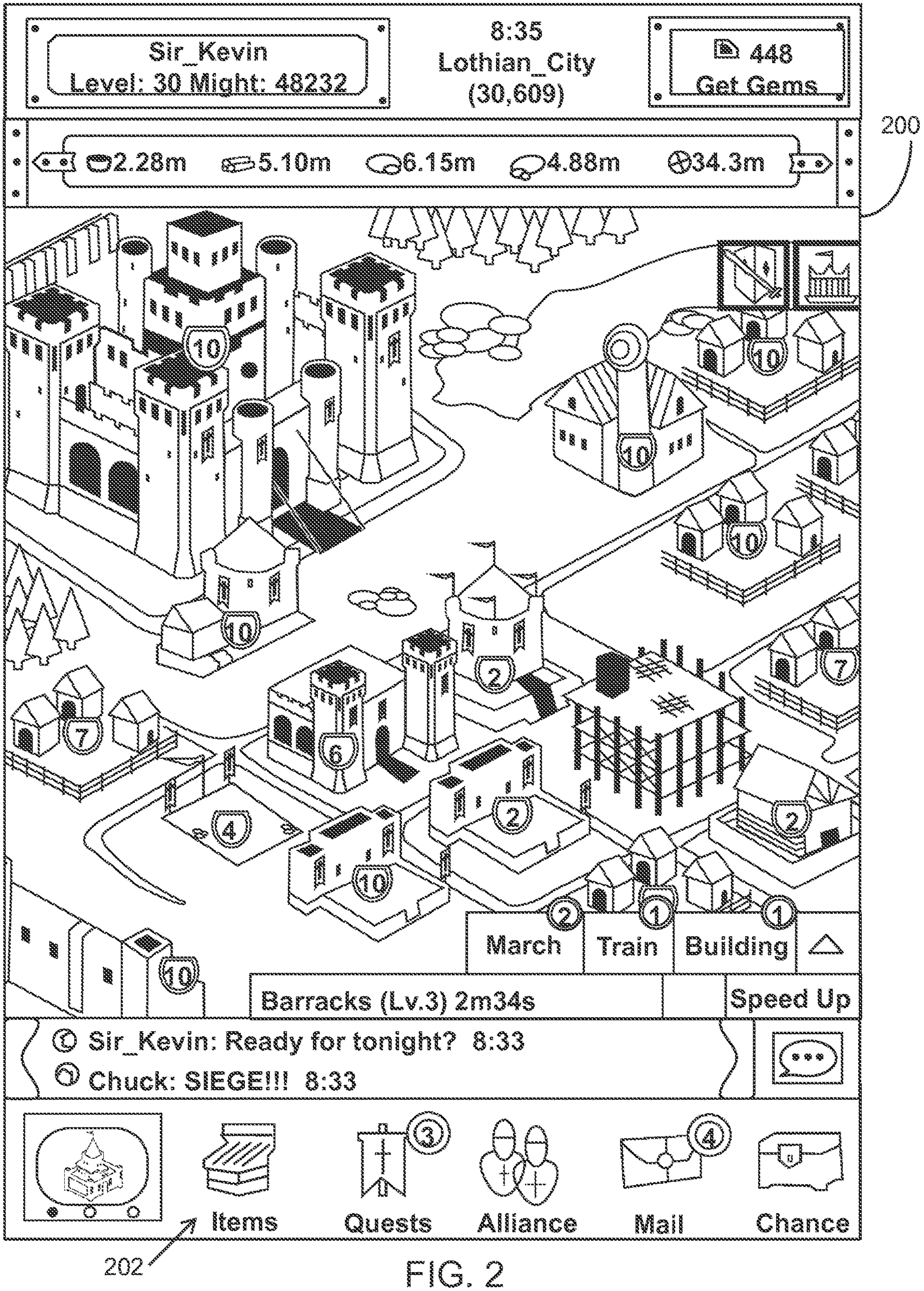
FIG. 2 illustrates an exemplary diagram of a player interface which implements a secondary game within an online game, according to an aspect of the invention.

FIG. 2 illustrates an exemplary diagram of a player interface which implements a secondary game within an online game, according to an aspect of the invention. As shown, user interface 200 enables a user to view a list of virtual items available for purchase by selecting the items tab 202.

Figure 3:
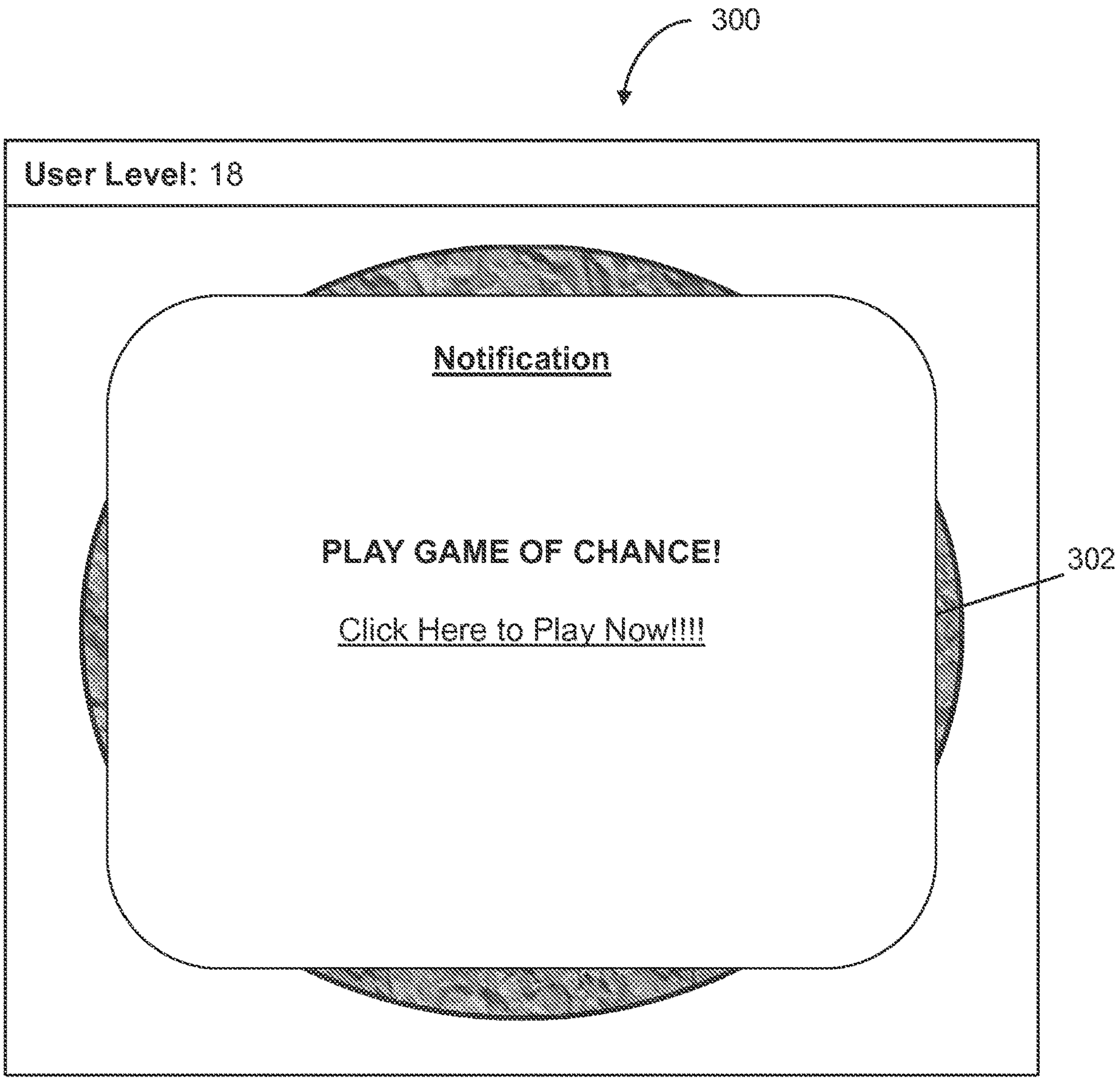
FIG. 3 illustrates an exemplary diagram of a player interface which implements a secondary game within an online game, according to an aspect of the invention.

FIG. 3 illustrates an exemplary diagram of a player interface 300 providing a notification associated with a secondary game within an online game, according to an aspect of the invention. A player may receive a notification 302 at any time to entice them to play the secondary game. Secondary game notifications may be in various forms including taking the form of banners, scrolling text or tickers, flashing objects, pop-up windows, frames or borders, e-mail notifications, SMS message notifications, and/or any other type of notification.

Figure 4A:
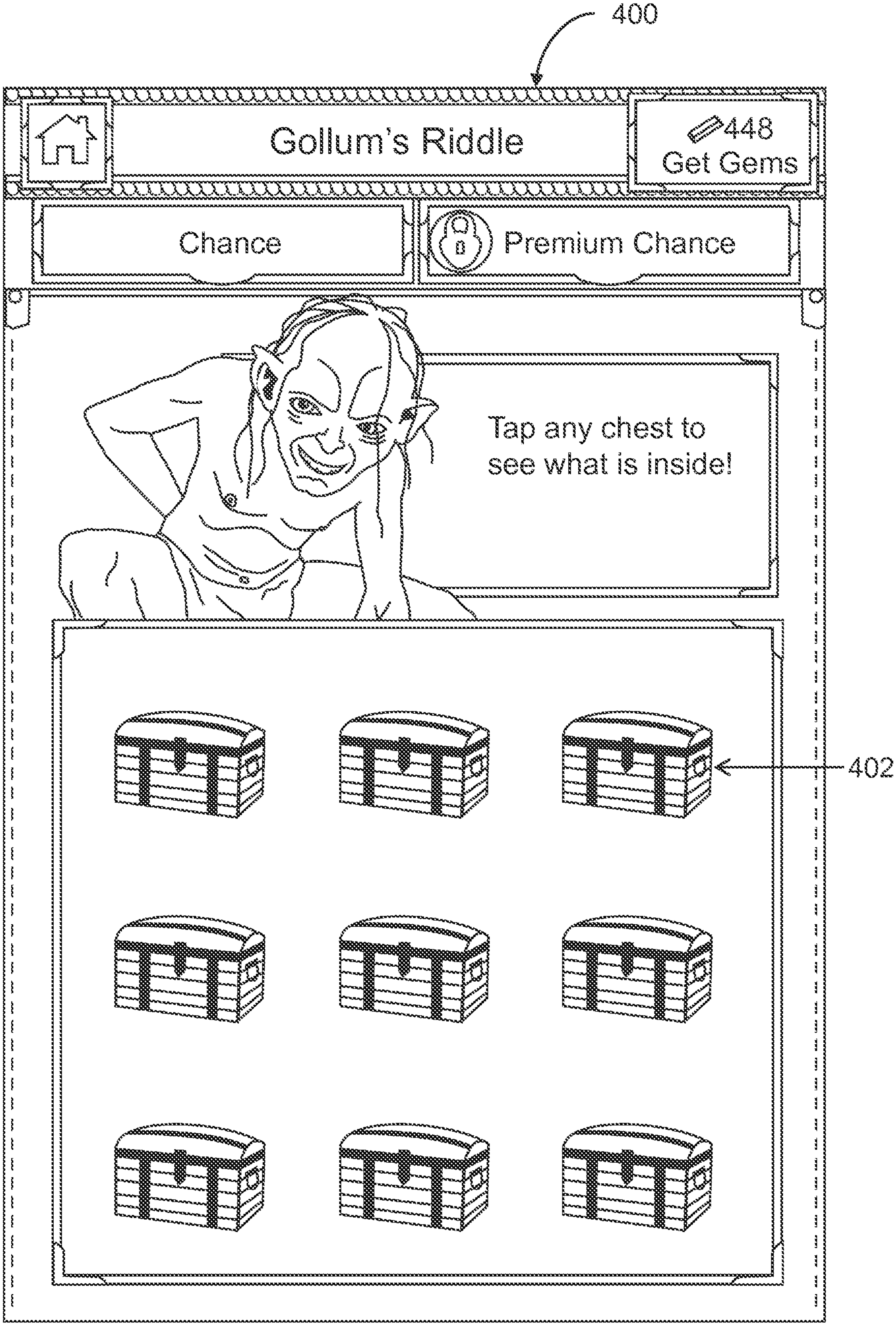
FIG. 4A illustrates an exemplary diagram of a player interface which implements a secondary game within an online game, according to an aspect of the invention.

FIG. 4A illustrates an exemplary diagram of a player interface 400 which implements a secondary game within an online game, according to an aspect of the invention. In some implementations, as shown, player interface 400 may enable a player to view a plurality of identical virtual containers for selection 402.

Figure 4B:
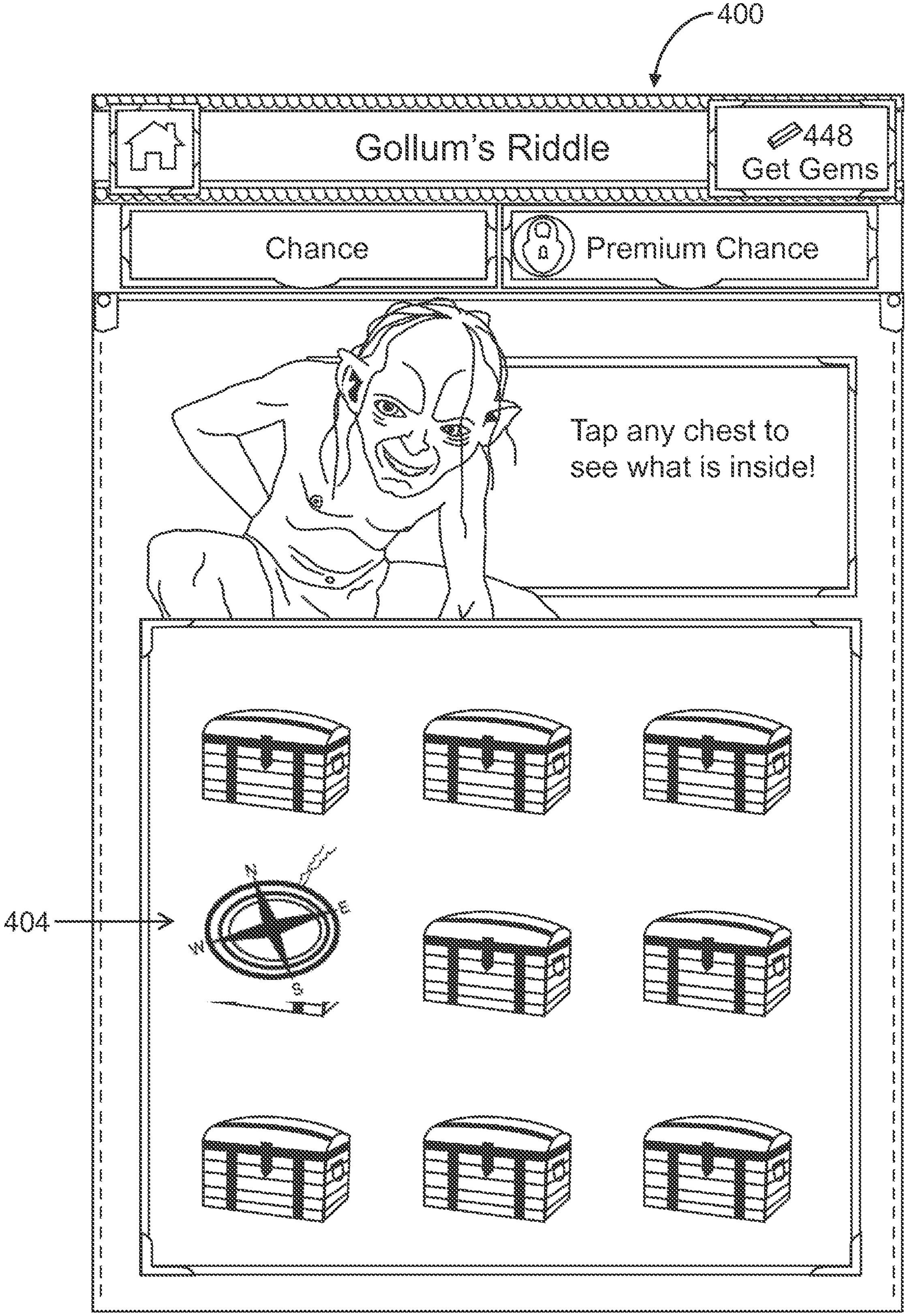
FIG. 4B illustrates an exemplary diagram of a player interface which implements a secondary game within an online game, according to an aspect of the invention.

FIG. 4B illustrates an exemplary diagram of a player interface 400 which implements a secondary game within an online game, according to an aspect of the invention. As shown, player interface 400 enables a player to select a first virtual container 404 which may contain a virtual item. Such virtual items may be implemented in the primary game. The first turn may be free, or may have an associated user cost to the player. A notification of the associated user cost may be provided to the player through the player interface 400.

Figure 5:
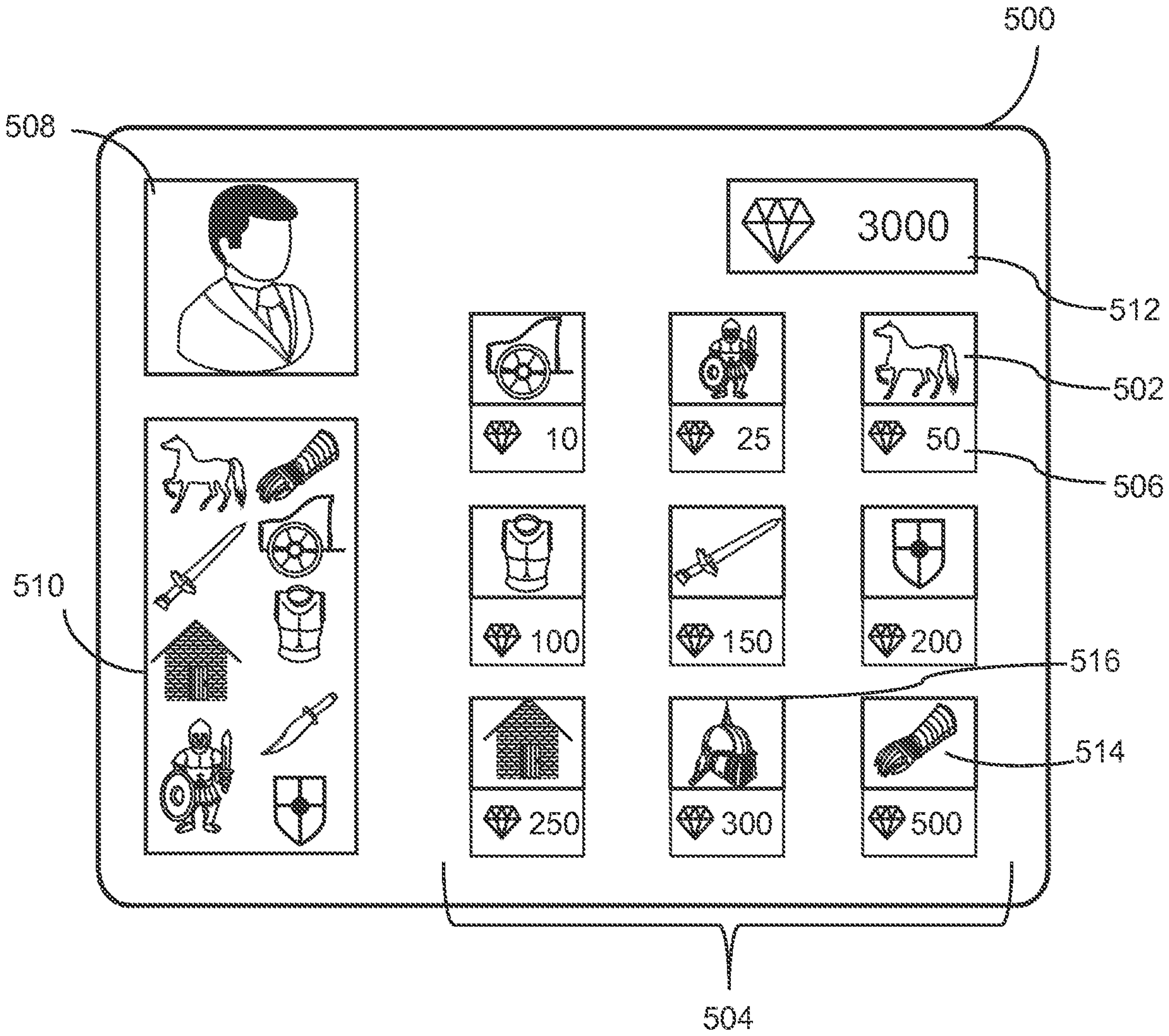
FIG. 5 illustrates an exemplary diagram of a player interface to facilitate selection and/or entry of one or more items to be removed from and/or replaced in the set of one or more potential awards.

FIG. 5 illustrates an exemplary diagram of a player interface 500 to facilitate selection and/or entry of one or more items 502 to be removed from and/or replaced in the set of one or more potential awards 504. The secondary game 110 component may be configured to effectuate presentation of the interface 500 to the first player, the interface 500 being configured to receive entry and/or selection of one or more of the potential awards 502 in the set of potential awards 504 to be removed from or replaced in the set of potential awards 504 to create an adjusted set of potential awards.

The interface 500 may be configured to indicate one or more user costs 506 associated with entry and/or selection of the one or more potential awards 502 in the set of potential awards to be removed from or replaced in the set of potential awards 504. The one or more user costs 506 may be an amount of virtual currency, an amount of real world currency, a virtual item, an achievement in the online game and/or other user costs. The user cost 506 associated with entry and/or selection of one or more potential awards 502 in the set of potential awards 504 may be based on a number of different factors. The associated user cost 506 may be variable between different players of the secondary game and/or variable between turns of the secondary game. In other embodiments, the associated user cost 506 may be constant across all users and all turns.

The interface 500 may further comprise information associated with the player. For example, as illustrated, the interface 500 may include identifying information about the player, such as the player's avatar 508, the inventory contents 510 of the player, the amount of virtual currency 512 held in credit for the player, and/or other information associated with the player. Where the inventory 510 of the player is displayed, the player may be able to make educated decisions about which of the individual items in the set of potential awards 504 the player wishes to remove and/or replace. For example, as illustrated, the inventory 510 indicates that the player has each of the items in the set of potential awards except for the item 516. As such, the player may desire to increase the probability of obtaining item 516 by removing some of the other items from the set of potential awards 504.

Figure 6:
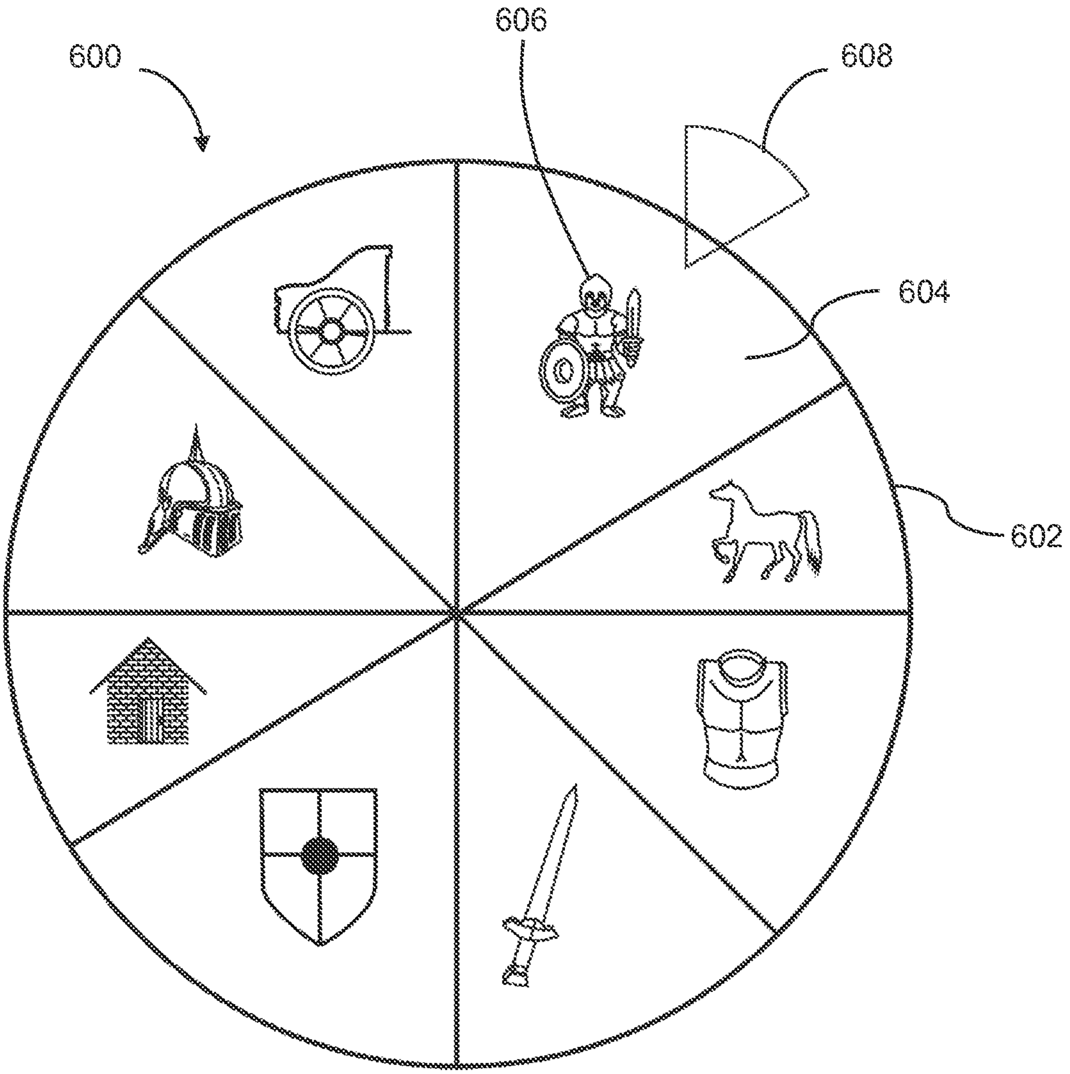
FIG. 6 illustrates an exemplary diagram of a secondary game 600, in accordance with one or more aspects of the disclosure.

FIG. 6 illustrates an exemplary diagram of a secondary game 600, in accordance with one or more aspects of the disclosure. By way of example, as illustrated, the secondary game 600 may be a wheel spin game. The player may interact with the secondary game 600 to initiate a turn of the secondary game 600. The wheel 602 may rotate and then slow to a stop, such that an individual segment 604 of the wheel 602 associated with one or more awards 606, may stop adjacent to an indicator 608. The secondary game component 110 (as shown in FIG. 1) may be configured to distribute the award 606 to the player for use within the online game. The probability of individual segment 604 of the wheel 602 landing or stopping adjacent the indicator 608 may be equal to the other segments of the wheel 602. The probability of the individual segment 604 of the wheel 602 landing or stopping adjacent the indicator 608 may not be equal to the other segments. The probability of the individual segment 604 of the wheel 602 landing or stopping adjacent the indicator 608 may be based on one or more parameters associated with the award 606 and/or the player.

The number of items, prizes and/or awards included in the set of potential awards 504 (as shown in FIG. 5) may not be equal to the number of segments, slots, containers, and/or outcomes of the secondary game. For example, as shown, the set of potential awards 504 includes nine individual virtual items which the player may remove and/or replace. The secondary game 600, as shown in FIG. 6, includes eight possible outcomes. Each outcome of the secondary game 600 may be associated with one of the awards in the set of potential awards 504. In the examples shown, virtual item 514 is not available to be obtained by the player when taking a turn of the secondary game 600. In other implementations, the number of awards in the set of potential awards may equal the number of possible outcomes in the secondary game.

Figure 7:
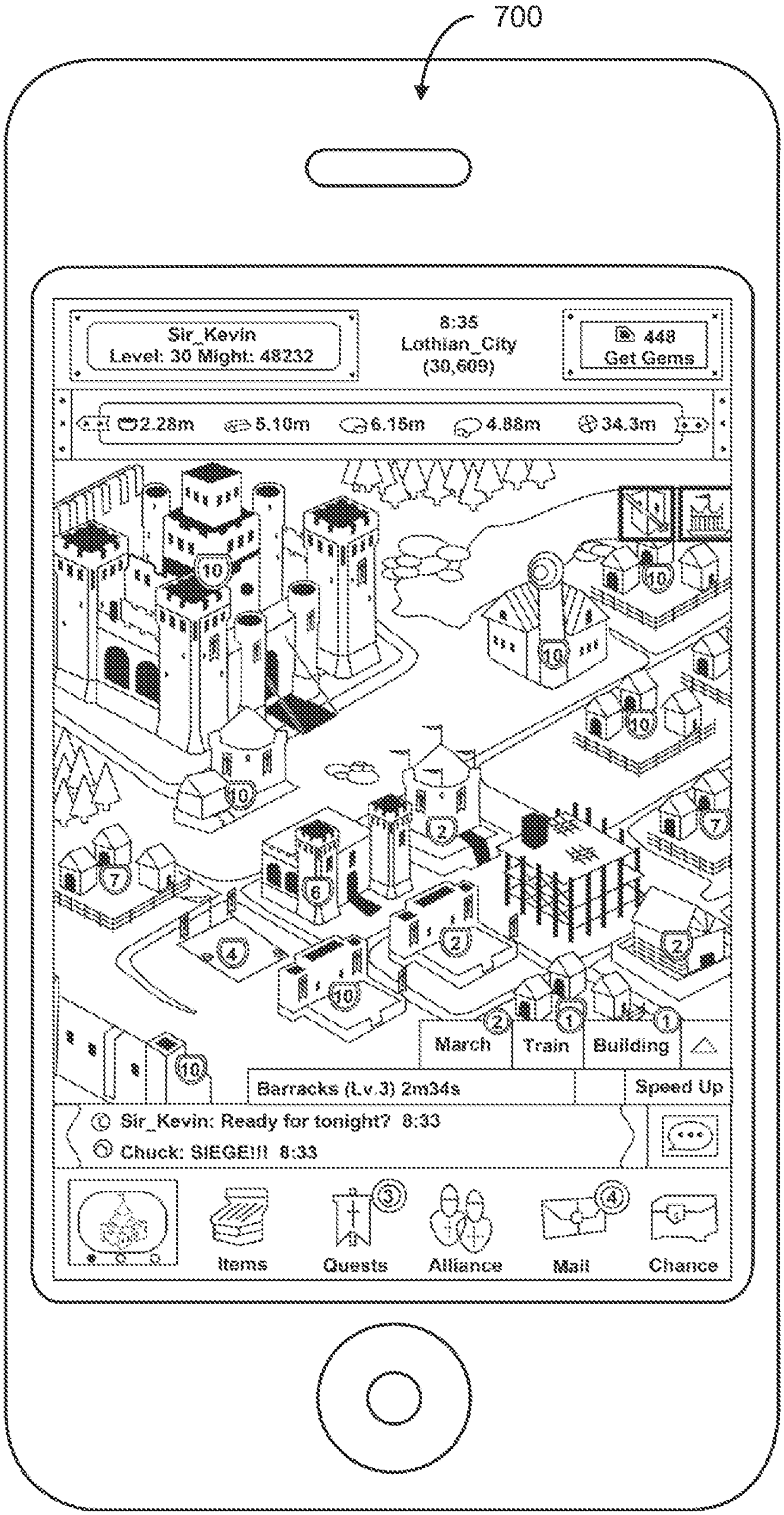
FIG. 7 illustrates an exemplary diagram of a player interface which implements a secondary game within an online game, according to an aspect of the invention.

FIG. 7 illustrates an exemplary diagram of a player interface 700 which implements a secondary game within an online game, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 8:
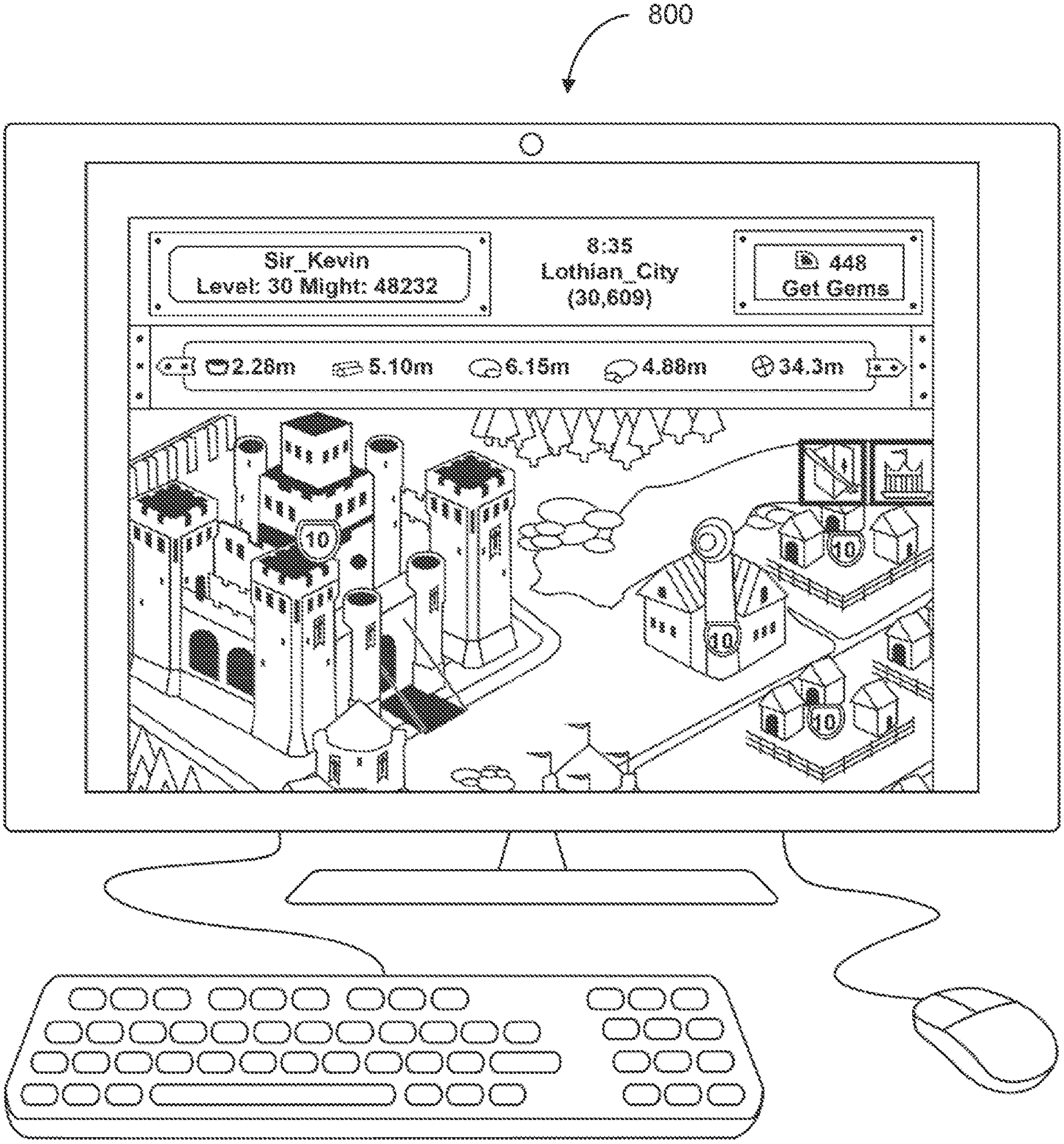
FIG. 8 illustrates an exemplary diagram of a player interface which implements a secondary game within an online game, according to an aspect of the invention.

FIG. 8 illustrates an exemplary diagram of a player interface 800 which implements a secondary game within an online game, according to an aspect of the invention.

Figure 9:
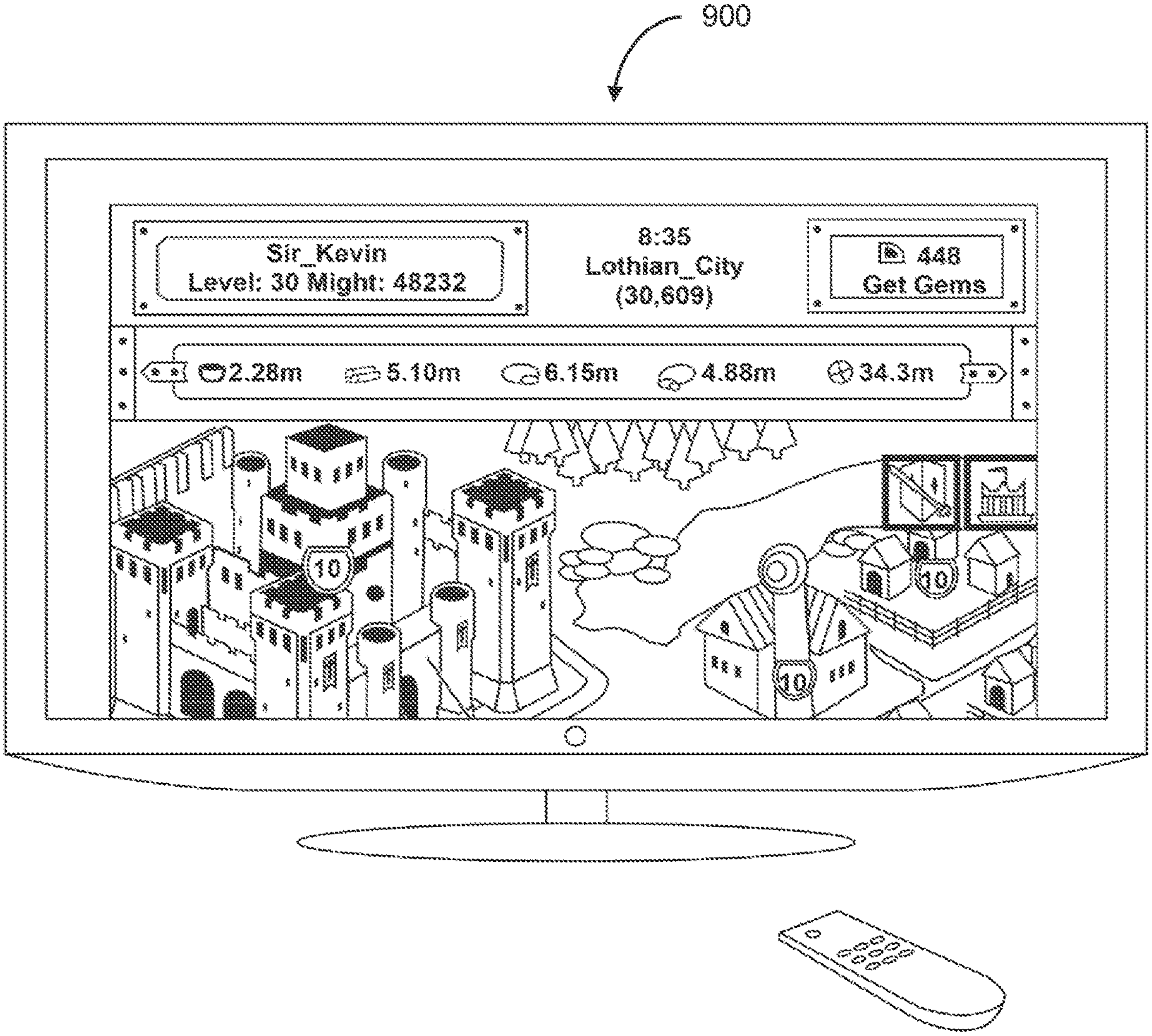
FIG. 9 illustrates an exemplary diagram of a player interface which implements a secondary game within an online game, according to an aspect of the invention.

FIG. 9 illustrates an exemplary diagram of a player interface 900 which implements dynamic content availability for individual players, according to an aspect of the invention.

It would be understood by one of ordinary skill in the art that the player interfaces may not be limited to the embodiment illustrated in FIGS. 2-9. The player interfaces may be associated with any objective, activity, action, or a combination thereof.

Figure 10:
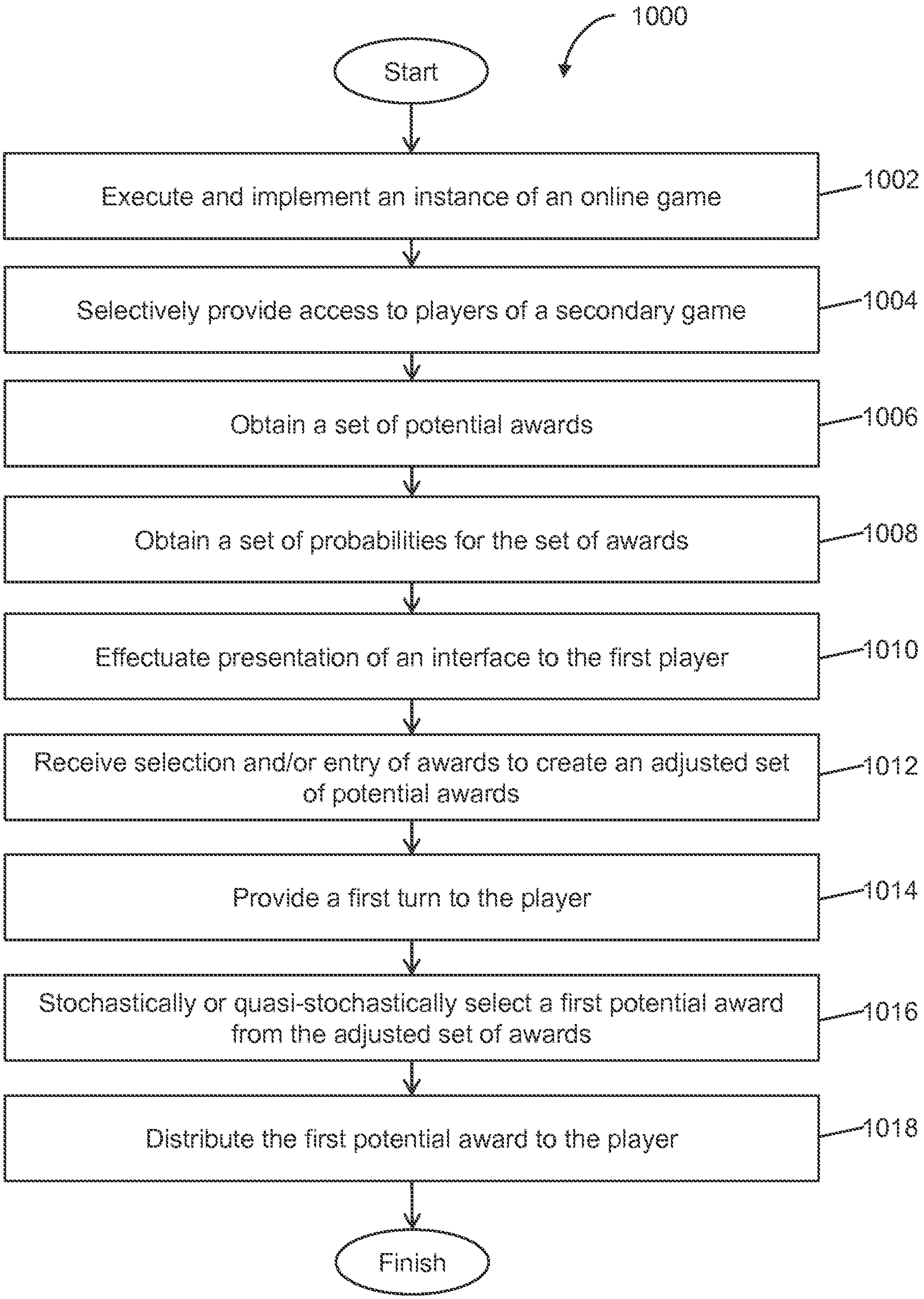
FIG. 10 illustrates a method for facilitating entry and/or selection of one or more awards, according to an aspect of the invention.

FIG. 10 illustrates a method 1000 for facilitating entry and/or selection of one or more awards, according to an aspect of the invention. The operations of method 1000 presented below are intended to be illustrative. In some embodiments, method 1000 may be accomplished with one or more additional operations not described, and/or without one or more of the operations discussed. The order in which the operations of method 1000 are illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, an instance of an online game may be executed. At an operation 1002 an instance of the online game may be implemented by facilitating, receiving, and executing commands in the instance of the online game to facilitate player participation in the online game, and to facilitate presentation of the online game on client computing platforms. In some implementations, operation 1000 may be performed by a game component the same as, or similar to, game component 108 (shown in FIG. 1 and described above).

At an operation 1004, access to the players of a secondary game may be selectively provided to facilitate player participations in individual episodes of the secondary game. In some implementations, operation 1004 may be performed by a secondary game component the same as, or similar to, secondary game component 110 (shown in FIG. 1 and described above).

At an operation 1006, a set of potential awards may be obtained and/or a first turn may be provided to the player. The individual potential awards may include virtual items usable in the online game. In some implementations, operation 46 may be performed by a secondary game component the same as, or similar to, secondary game component 110 (shown in FIG. 1 and described above).

At an operation 1008, a set of award probabilities may be obtained for the set of potential awards. In some implementations, operation 1008 may be performed by a secondary game component the same as, or similar to, secondary game component 110 (shown in FIG. 1 and described above).

At an operation 1010, presentation of an interface to the first player may be effectuated. The interface may be configured to receive entry and/or selection of one or more of the potential awards in the set of potential awards to be removed from or replaced in the set of potential awards to create an adjusted set of potential awards. In some implementations, operation 1010 may be performed by a secondary game component the same as, or similar to, secondary game component 110 (shown in FIG. 1 and described above).

At an operation 1012, selection and/or entry of awards to create an adjusted set of potential awards may be received. In some implementations, operation 1012 may be performed by a secondary game component the same as, or similar to, secondary game component 110 (shown in FIG. 1 and described above).

At an operation 1014, a first turn of the secondary game may be provided to the player. In some implementations, operation 1014 may be performed by a secondary game component the same as, or similar to, secondary game component 110 (shown in FIG. 1 and described above).

At an operation 1016, a first potential award may be stochastically or quasi-stochastically selected from the adjusted set of potential awards as an actual award for distribution for the first turn based on the award probabilities. In some implementations, operation 1016 may be performed by a secondary game component the same as, or similar to, secondary game component 110 (shown in FIG. 1 and described above).

At an operation 1018, the first potential award may be distributed to the first player for use within the online game. In some implementations, operation 1016 may be performed by a secondary game component the same as, or similar to, secondary game component 110 (shown in FIG. 1 and described above). Method 1000 may comprise additional or different operations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating user-controlled replacements of potential awards in secondary games within an online game, the system comprising:

one or more processors configured to execute machine-readable instructions to:

execute an instance of the online game, and implement the instance of the online game by receiving commands from players and executing the commands in the instance of the online game, wherein the players include a first player controlling one or more elements that interact within the online game;

effectuate a presentation of a user interface to the first player, the user interface being configured to:

(i) provide access to a secondary game within the online game;

(ii) present in the user interface, to the first player, graphical user interface elements representing a set of potential awards that the first player has potential to be awarded upon interaction with the secondary game, the individual potential awards in the set of potential awards including virtual items usable by the one or more elements controlled by the first player;

(iii) receive selection by the first player of one or more of the individual potential awards in the set of potential awards to be replaced in the set of potential awards to create, upon replacement, an adjusted set of potential awards; and (iv) remove the graphical user interface elements that represent the selected one or more of the individual potential awards from the user interface such that the presented graphical user interface elements represent the adjusted set of potential awards;

effectuate interaction by the first player with the secondary game;

responsive to the interaction and based on one or more results of the interaction and a set of award probabilities for the adjusted set of potential awards, select a first potential award from the adjusted set of potential awards as an actual award to be awarded to the first player; and award the actual award to the first player.

2. The system of claim 1, wherein the online game takes place in a virtual space, wherein the players control elements that move through and interact with the virtual space.

3. The system of claim 1, wherein the user interface further indicates user cost associated with the selection of the one or more individual potential awards in the set of potential awards to be replaced in the set of potential awards.

4. The system of claim 3, wherein the associated user cost is determined based on a value of individual ones of the individual potential awards in the set of potential awards.

5. The system of claim 3, where in the associated user cost is determined based on the specific potential award or potential awards to be replaced in the set of potential awards.

6. The system of claim 3, wherein the associated user cost is determined based on an indication of the potential awards in the adjusted set of potential awards once a potential award has been selected for replacement.

7. The system of claim 1, wherein the selection of the one or more of the individual potential awards in the set of potential awards to be replaced in the set of potential awards has an associated user cost based on values of individual ones of the potential awards in the adjusted set of potential awards.

8. The system of claim 1, wherein the one or more processors are further configured to determine the set of award probabilities, wherein determination of the set of award probabilities is based on a value of the remaining potential awards, wherein remaining potential awards are the set of potential awards minus awarded actual awards.

9. The system of claim 1, wherein the secondary game is episodic.

10. The system of claim 1, wherein the actual award is added to a first inventory of the first player.

11. The system of claim 1, wherein the one or more processors are further configured to facilitate selection by an administrator of the individual potential awards to be included in the set of potential awards.

12. A method for facilitating user-controlled replacements of potential awards in secondary games within an online game, the method implemented on a computer system that includes one or more computer processors, the method comprising:

executing an instance of the online game;

implementing the instance of the online game, receiving commands from players, and executing the commands in the instance of the online game, wherein the players include a first player controlling one or more elements that interact within the online game;

effectuating a presentation of a user interface to the first player, wherein the user interface (i) provides access to a secondary game within the online game, (ii) presents, to the first player, graphical user interface elements representing a set of potential awards that the first player has potential to be awarded upon interaction with the secondary game, the individual potential awards in the set of potential awards including virtual items usable by the one or more elements controlled by the first player, (iii) receives entry and/or selection by the first player of one or more of the individual potential awards in the set of potential awards to be replaced in the set of potential awards to create, upon replacement, an adjusted set of potential awards, and (iv) removes the graphical user interface elements that represent the selected one or more of the individual potential awards from the user interface such that the presented graphical user interface elements represent the adjusted set of potential awards;

effectuating interaction by the first player with the secondary game;

responsive to the interaction and based on one or more results of the interaction and a set of award probabilities for the adjusted set of potential awards, selecting a first potential award from the adjusted set of potential awards as an actual award to be awarded to the first player; and awarding the actual award to the first player.

13. The method of claim 12, wherein the online game takes place in a virtual space, wherein the players control elements that move through and interact with the virtual space.

14. The method of claim 12, wherein the user interface further indicates user cost associated with the selection of the one or more individual potential awards in the set of potential awards to be replaced in the set of potential awards.

15. The method of claim 14, wherein the associated user cost is determined based on a value of individual ones of the individual potential awards in the set of potential awards.

16. The method of claim 14, wherein the associated user cost is determined based on the specific potential award or potential awards to be replaced in the set of potential awards.

17. The method of claim 12, further comprising:

determining the set of award probabilities, wherein determination of the set of award probabilities is based on the values of remaining potential awards, wherein remaining potential awards are the set of potential awards minus awarded actual awards.

18. The method of claim 12, wherein the actual award is added to a first inventory of the first player.

* * * * *